(12) United States Patent
Zargarian et al.

(10) Patent No.: US 11,966,484 B2
(45) Date of Patent: *Apr. 23, 2024

(54) COMPUTING DEVICE COMPATIBLE ENCRYPTION AND DECRYPTION

(71) Applicant: Arebus LLC, Arlington, MA (US)

(72) Inventors: Edwin Zargarian, Arlington, MA (US); Andrew Robert Rolfe, Deerfield, IL (US)

(73) Assignee: Arebus LLC, Arlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/190,913

(22) Filed: Mar. 27, 2023

(65) Prior Publication Data

US 2023/0237174 A1 Jul. 27, 2023

Related U.S. Application Data

(63) Continuation of application No. 17/534,429, filed on Nov. 23, 2021, now Pat. No. 11,615,198, which is a
(Continued)

(51) Int. Cl.
*G06F 21/00* (2013.01)
*G06F 9/54* (2006.01)
(Continued)

(52) U.S. Cl.
CPC ............ *G06F 21/606* (2013.01); *G06F 9/544* (2013.01); *G06F 21/6218* (2013.01); *H04L 63/0428* (2013.01); *G06F 3/0486* (2013.01)

(58) Field of Classification Search
None
See application file for complete search history.

(56) References Cited

U.S. PATENT DOCUMENTS 7,380,120 B1 * 5/2008 Garcia ............... H04L 63/20
713/168
8,065,713 B1 * 11/2011 Vainstein ........... H04L 63/0428
713/168
(Continued)

OTHER PUBLICATIONS

Lai, Sen-Tarng. An Analyzer-Based Software Security Measurement Model for Enhancing Software System Security. 2010 Second World Congress on Software Engineering. https://ieeexplore.ieee.org/stamp/stamp.jsp?tp=&arnumber=5718353 (Year: 2010).*
(Continued)

*Primary Examiner* — Jeremiah L Avery
(74) *Attorney, Agent, or Firm* — Kilpatrick Townsend & Stockton LLP

(57) ABSTRACT

A computer-implemented method comprising receiving, based on a first user interface of a first application executing on a first device, user input that indicates a recipient, the recipient associated with registration information that indicates a method of communication with the recipient and an encryption key associated with the method of communication. The method causing an encrypted message to be generated based on the encryption key, the encrypted message encrypting clear data based on received user input, causing the encrypted message to be formatted into an encrypted package, that is in an application format compatible with a second application corresponding to the method of communication, wherein the application format is compatible with the second application by at least being a format that is allowed to be sent or to be processed by the second application, and providing the encrypted package to the second application to be sent to the recipient.

20 Claims, 22 Drawing Sheets

Related U.S. Application Data continuation of application No. 17/076,475, filed on Oct. 21, 2020, now Pat. No. 11,610,010, which is a continuation of application No. 15/910,699, filed on Mar. 2, 2018, now Pat. No. 10,846,415.

(60) Provisional application No. 62/466,300, filed on Mar. 2, 2017.

(51) Int. Cl.
*G06F 21/60* (2013.01)
*G06F 21/62* (2013.01)
*H04L 9/40* (2022.01)
*G06F 3/0486* (2013.01)

(56) References Cited

U.S. PATENT DOCUMENTS

| | | | | |
|---|---|---|---|---|
| 10,360,545 | B2* | 7/2019 | Lee | G06F 21/6227 |
| 2002/0178370 | A1* | 11/2002 | Gurevich | G06F 21/34 |
| | | | | 713/184 |
| 2002/0199119 | A1* | 12/2002 | Dunnion | H04L 51/00 |
| | | | | 726/4 |
| 2005/0039034 | A1* | 2/2005 | Doyle | H04L 9/0825 |
| | | | | 713/193 |
| 2007/0011749 | A1* | 1/2007 | Allison | G06F 21/6218 |
| | | | | 713/165 |
| 2012/0222134 | A1* | 8/2012 | Orsini | G06F 21/602 |
| | | | | 726/28 |
| 2012/0290950 | A1* | 11/2012 | Rapaport | H04L 12/1818 |
| | | | | 715/753 |
| 2014/0032691 | A1* | 1/2014 | Barton | H04W 12/08 |
| | | | | 709/206 |
| 2014/0033271 | A1* | 1/2014 | Barton | H04W 12/64 |
| | | | | 726/1 |
| 2014/0188946 | A1* | 7/2014 | Hartman | G06F 16/9024 |
| | | | | 707/805 |
| 2017/0090734 | A1* | 3/2017 | Fitzpatrick | G06F 3/0486 |
| 2022/0086128 | A1 | 3/2022 | Zargarian et al. | |

OTHER PUBLICATIONS

Khan, K.Md; Han, Jun. A security characterisation framework for trustworthy component based software systems. Proceedings 27th Annual International Computer Software and Applications Conference. COMPAC 2003. https://ieeexplore.ieee.org/stamp/stamp.jsp?tp=&arnumber=1245337 (Year: 2003).*

Iyer, Ravishankar K. et al. Toward Application-Aware Security and Reliability. IEEE Security & Privacy vol. 5, Issue: 1. https://ieeexplore.ieee.org/stamp/stamp.jsp?tp=&arnumber=4085595 (Year: 2007).*

U.S. Appl. No. 15/910,699, Non Final Office Action dated Mar. 19, 2020.

U.S. Appl. No. 15/910,699, Notice of Allowance dated Jul. 21, 2020.

Arora et al., "Architectural Support for Run-Time Validation of Program Data Properties," IEEE Transactions on Very Large Scale Integration (VLSI) Systems, vol. 15, Issue: 5. https://ieeexplore.ieee.org/stamp/stamp.jsp?tp+&arnumber=4212136 (Year: 2007), 14 pages.

Bhatt, Zalak et al., "Advanced security technique for format preserving encryption," [Accessed 2016] Retreived from the internet: https://ieeexplore.ieee.org/stamp/stamp.jsp?tp=&arnumber=7823194, 2 pgs.

Blanc et al., "A Collaborative Approach for Access Control, Intrusion Detection and Security Testing," International Symposium on Collaborative Technologies and Systems (CTS'06). https://ieeexplore.iees.org/stamp/stamp.jsp?tp=&arnumber=1644145 (Year: 2006), 8 pages.

Raj, Gaurav et al., "Enhancement of security mechanism for confidential data using AES-128, 192 and 256bit encryption in cloud," Accessed [2015] Retreived from the Internet: https://ieeexplore.ieee.org/stamp/stamp.jsp?tp=&arnumber=7375144, 2 pgs.

Zhao, Lei et al., Collaborative reversing of input formats and program data structures for security applications. China Communications, vol. 11, Issue: 9, 2014, 13 pages. Rerieved from the Internet https://ieeexplore.ieee.org/stamp/stamp.jsp?tp=&arnumber=6969778.

Rubin, Bradley et al., "Creating a Computer Security Curriculum in a Software Engineering Program," 29th International Conference on Software Engineering (ICSE'07) 2007, 4 pages. Retrieved from the Internet: https://ieeexplore.ieee.org/stamp/stamp.jsp?tp=&arnumber=4222636.

Khan et al., "A security characterisation framework for trustworthy component based software systems," Proceedings 27th Annual International Computer Software and Applications Conference. COMPSAC 2003, 6 pages. Retrieved from the Internet: https://ieeexplore.ieee.org/stamp/stamp.jsp?tp=&arnumber=1245337.

* cited by examiner

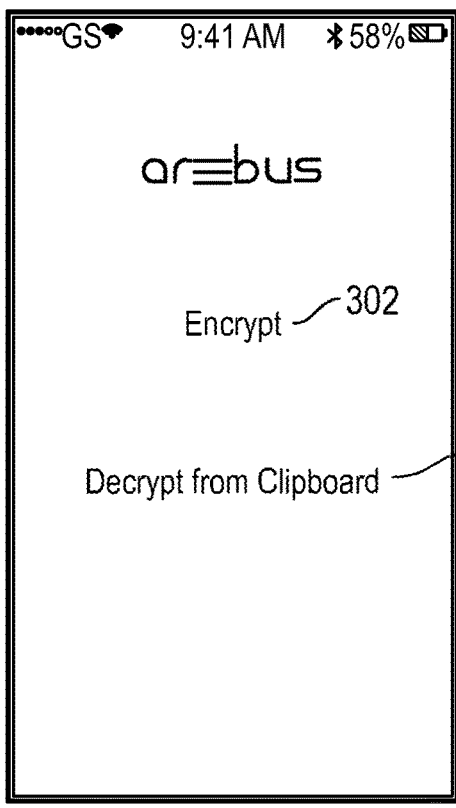
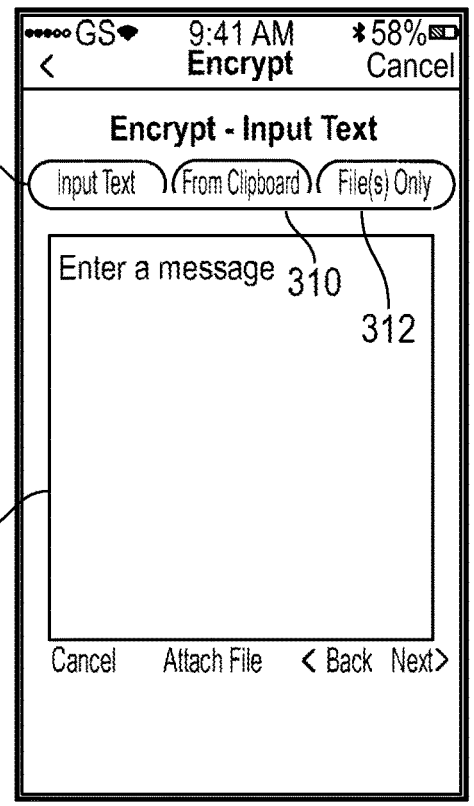
FIG. 3A
FIG. 3B
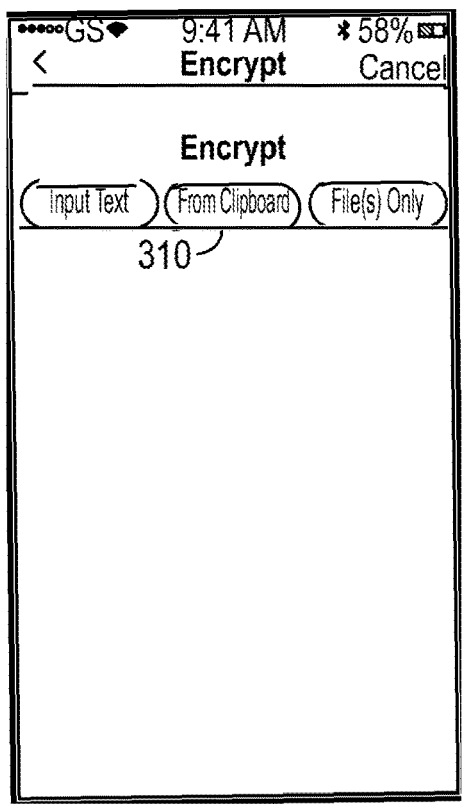
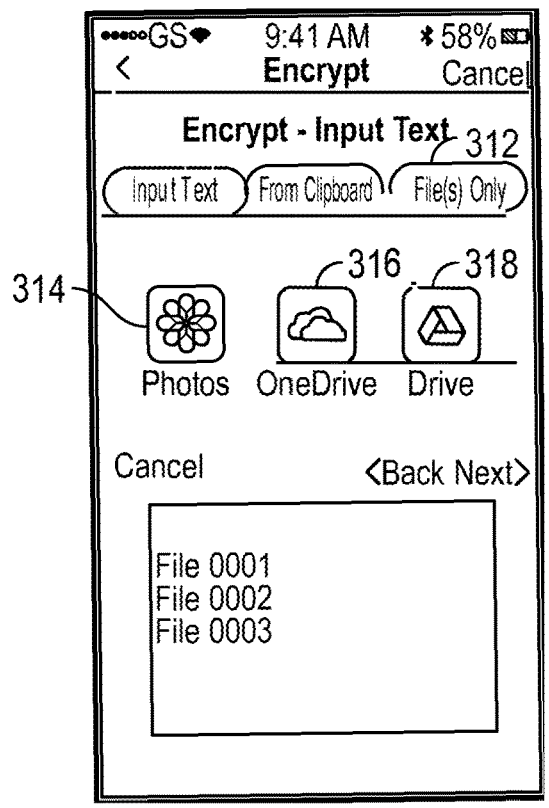
FIG. 3C
FIG. 3D

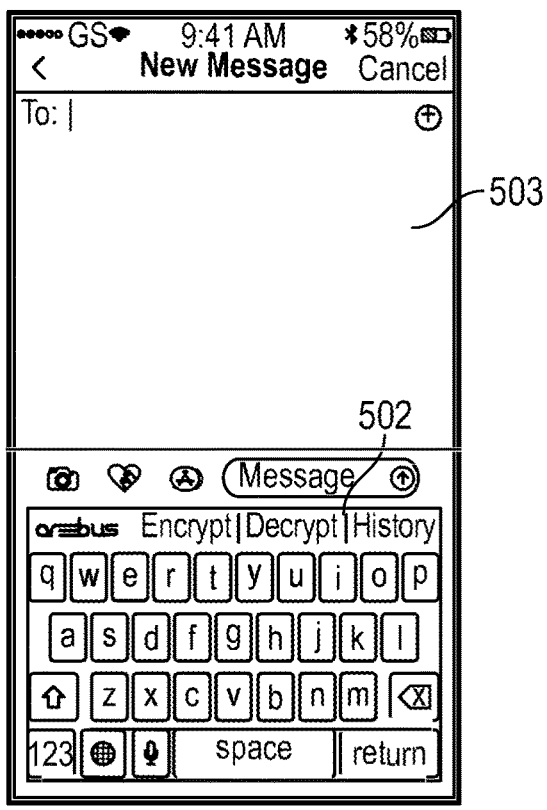
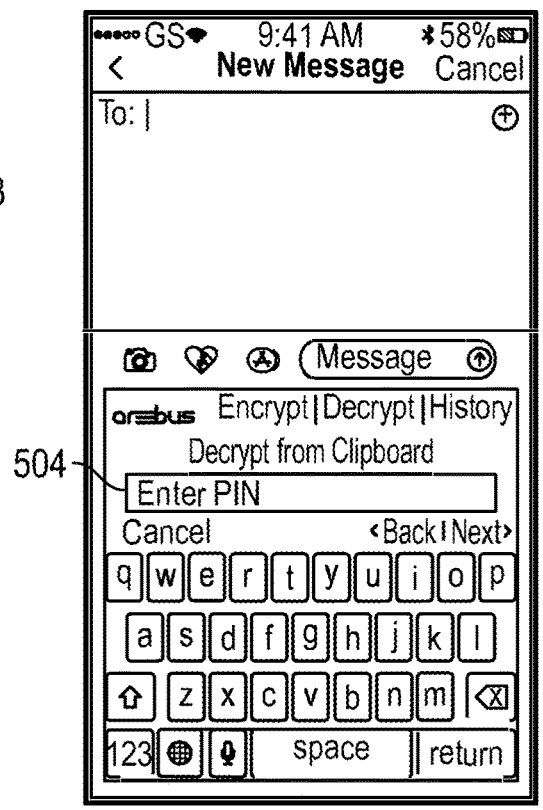
FIG. 5A    FIG. 5B
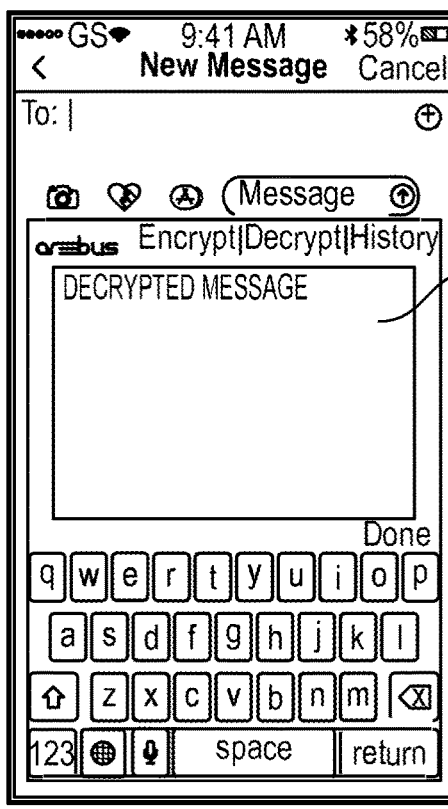
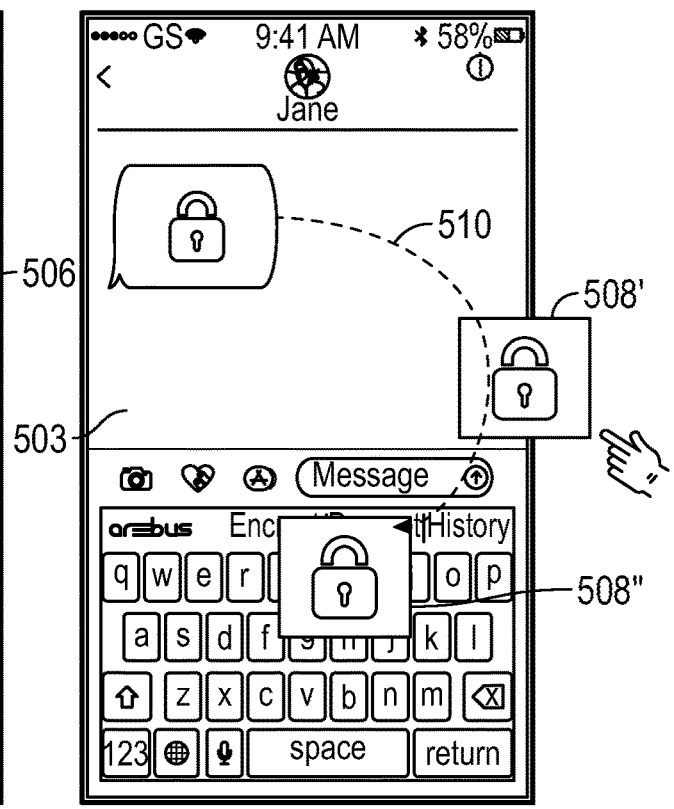
FIG. 5C    FIG. 5D

1400

1402

Receiving, based on a first user interface of a first application executing on a first device, user input that indicates a recipient, the recipient associated with registration information that indicates a method of communication with the recipient and an encryption key associated with the method of communication

1404

Causing an encrypted message to be generated based on the encryption key, the encrypted message encrypting clear data received via the first user interface

1406

Causing the encrypted message to be formatted into an encrypted package

1408

Providing the encrypted package to the second application to be sent to the recipient

*FIG. 14*

COMPUTING DEVICE COMPATIBLE ENCRYPTION AND DECRYPTION

CROSS-REFERENCES TO RELATED APPLICATIONS

This application is a continuation-in-part of U.S. application Ser. No. 17/534,429 filed Nov. 23, 2021, now U.S. Pat. No. 11,615,198, issued Mar. 28, 2023, which claims priority to U.S. patent application Ser. No. 17/076,475, filed Oct. 21, 2020, now U.S. Pat. No. 11,610,010, issued Mar. 21, 2023 which is a continuation of U.S. patent application Ser. No. 15/910,699, filed Mar. 2, 2018, now U.S. Pat. No. 10,846,415, issued Nov. 24, 2020, which claims priority to U.S. Provisional Application No. 62/466,300, filed Mar. 2, 2017, the contents of such applications being incorporated by reference herein.

FIELD

The subject matter of the present application is a system, method and application for securing content, and more particularly, to a system, method and application for encrypting and decrypting data for use in a computing device such as a mobile device.

BACKGROUND OF THE INVENTION

Currently available mobile platforms have few, if any, unified encryption services that are compatible across different mobile, social media, and email applications. Typically, each application or service performs encryption and decryption independently of other applications and services. Furthermore, in many instances the user has little or no control over how the encrypted data is transmitted or stored.

The encryption and security services available today are fairly restrictive. Many such services use a dedicated stand-alone application to add privacy and/or security to their existing workflow, requiring the user to become familiar with a different process for each application/service on the mobile platform. This creates inconvenience and complexity, which decreases the chances that users will opt to employ these services. Not using the encryption services, however, puts users at risk of having their data compromised.

For example, a message inadvertently sent through a messaging application may be recalled only if the application contains a recall function. Further, even when a user deletes a message, that message may not be immediately deleted from the database of the messaging application.

Mobile platforms present a challenging environment for adding security to online and social services. In order to ensure privacy, a user may need to swap among applications to encrypt, send, post, and/or upload content security. For example, a user who wants to send a private message may need to switch from their commonly used applications to another secured application to format and send the encrypted message. The encrypted message will then be inaccessible from the commonly used applications.

BRIEF SUMMARY OF THE INVENTION

This summary is not an extensive overview of the claimed subject matter. It is intended to neither identify key elements of the claimed subject matter nor delineate the scope of the claimed subject matter. Its sole purpose is to present some concepts of the claimed subject matter in a simplified form as a prelude to the more detailed description that is presented later.

A method and apparatus encrypting data for use by an application includes receiving a first clear data in a security application running concurrently with the application. The security application encrypts the first clear data to generate a first encrypted package and distributes the encrypted package for use by the application or by other applications running concurrently with the application. The security application also receives and decrypts encrypted packages from the application or one of the other applications to provide clear data for use by the application.

According to one aspect, the security application may be implemented as a component of a data entry utility that can be directly accessed from the application.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description when considered in conjunction with the drawings.

BRIEF DESCRIPTION OF THE DRAWINGS

FIGS. 3A, 3B, 3C, 3D, 3E, 3F, 3G, 3H, 3I, 3J, and 3K are user interface diagrams useful for describing a first example encryption scenario.

FIGS. 5A, 5B, 5C and 5D are user interface diagrams useful for describing a first example decryption scenario.

FIG. 14 is a flow diagram useful for describing how a global private contact registry can be used by a user device.

DETAILED DESCRIPTION OF THE INVENTION

Figure 1:
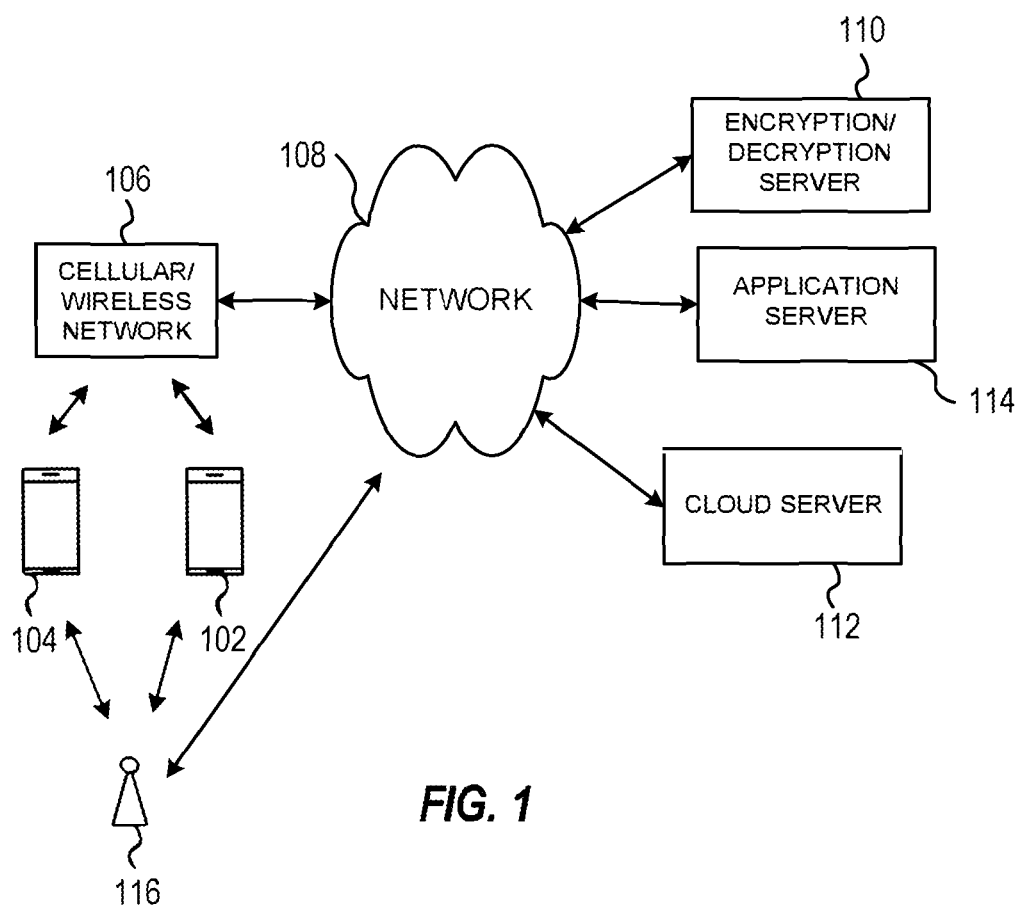
FIG. 1 is a block diagram showing an example network environment for the example systems and methods.

As a preliminary matter, some of the figures describe concepts in the context of one or more structural components, variously referred to as functionality, modules, features, elements, or the like. The various components shown in the figures can be implemented in any manner, such as software, hardware, firmware, or combinations thereof. In some cases, various components shown in the figures may reflect the use of corresponding components in an actual implementation. In other cases, any single component illustrated in the figures may be implemented by a number of actual components. The depiction of any two or more separate components in the figures may reflect different functions performed by a single actual component.

Other figures describe the concepts in flowchart or screenshot form. In this form, certain operations are described as being performed using distinct screens or blocks that are used in a certain order. Such implementations are exemplary and non-limiting. Certain blocks/screens described herein can be grouped together and performed in a single operation, certain blocks/screens can be broken apart into multiple component blocks or screens, and certain blocks/screens can be performed in an order that differs from that which is illustrated herein, including a parallel manner of implementing the blocks/screens. The blocks shown in the screenshots and flowcharts can be implemented using software, hardware, firmware, manual processing, or the like. As used herein, hardware may include microprocessors, digital signal processors (DSPs), microcontrollers, computer systems, discrete logic components, and/or custom logic components such as field programmable gate arrays (FPGAs), application specific integrated circuits (ASICs), programmable logic arrays (PLAs) or the like.

As to terminology, the phrase "configured to" encompasses any way that any kind of functionality can be constructed to perform an identified operation. The functionality can be configured to perform an operation using, for example, software, hardware, firmware, or the like. For example, the phrase "configured to" can refer to a logic circuit structure of a hardware element that is arranged to implement the associated functionality. The phrase "configured to" can also refer to a logic circuit structure of a hardware element that is arranged to implement the coding design of associated functionality of firmware or software. The term "module" refers to a structural element that can be implemented using any suitable hardware (e.g., a processor, among others), software (e.g., an application, among others), firmware, and/or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system. The term "application" may refer to an application running locally on the device, a remote application accessible through a network or a web application accessible through a browser application on the mobile device.

Although the examples described below show one or more applications running on a mobile device, it is contemplated that the subject matter of this application may be implemented on stationary computing devices such as, without limitation, desktop computers, virtual machine computing environments, or computing workstations.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any non-transitory computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

The embodiments described below are for a security system in which users can encrypt and decrypt data independently of the application used, through the use of a mobile security application. The security application may be implemented as an application configured to run concurrently with other applications on the computing device. Concurrent running may be implemented by a user starting both the security and the other application via multitasking. Alternatively or in addition, running the security application concurrently with the other applications may involve the other applications accessing the security application directly. In particular, the security application may be implemented as a security soft keyboard which may replace or augment a soft keyboard utility of the mobile device. Further, the security application may be capable of receiving input from a hardware keyboard. Thus, in the materials below, references to the "security application" also cover the soft keyboard utility, augmented soft keyboard utility, and hardware keyboard utility. In some embodiments, the mobile security application allows users to encrypt/decrypt text entered using the soft keyboard, a hardware keyboard and/or data or files available on their devices from other applications or in cloud storage. When the security application is implemented as a soft keyboard and/or receives input from a hardware keyboard, the user may enter encryption or decryption commands using keys on the keyboard. The users can package the encrypted data into file formats compatible with existing third party applications/services and can control who is allowed decrypt the encrypted content. The encrypted data may be distributed to other users via the third party application/service. Once the recipient receives the encrypted data through the third party application/service, the recipient can decrypt the data using the example security application, which can also authenticate the encrypted data.

Implementing the security application as a soft keyboard that replaces or augments a soft keyboard utility on the mobile device may be particularly advantageous because the soft keyboard may be invoked from many applications that run on the mobile device. Using such a keyboard, a user may encrypt and/or decrypt data from the application without having to open a separate security application. Alternatively, the security application as an application that is open concurrently with another application on the mobile device via multitasking.

The following examples describe workflows and user interfaces for encrypting and sending encrypted data packages and for receiving and decrypting the data packages using example systems.

FIG. 1 is a block diagram showing an example network environment for the example systems and methods. In the example shown in FIG. 1, a user of a first mobile device 102 wants to exchange encrypted data to a user of a second mobile device 104 through a cellular wireless network 106, for example, via a messaging application, an e-mail application and/or a social media application. Alternatively, the mobile devices 102 and 104 may be configured to exchange encrypted data using similar applications via a wireless network, for example a Wi-Fi network 116 operating according to one or more of the IEEE 802.11 or IEEE 802.15 standards. Both the cellular wireless network 106 and the Wi-Fi network 116 may be coupled to an encryption/decryption server 110 and to one or more application servers 114 via a wide area network (e.g. the Internet) 108. As described below, in addition to exchanging encrypted data with other users, a user may want to encrypt data, for example, personal photographs, for storage on a cloud server 112 which is also accessible via the network 108.

Figure 2:
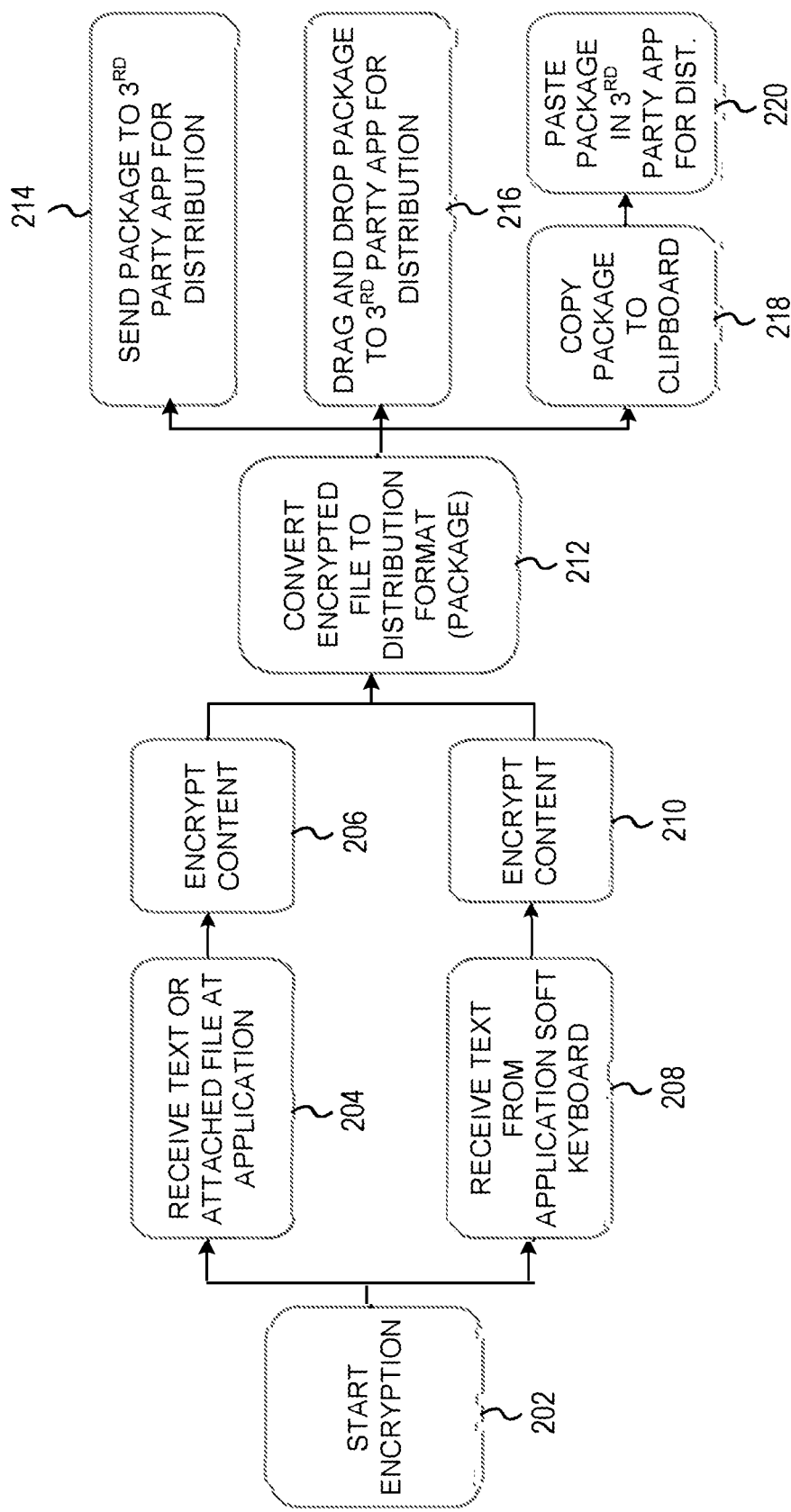
FIG. 2 is a flow chart showing several alternative encryption scenarios.

FIG. 2 is a flow chart showing several alternative encryption and distribution scenarios that may be implemented using the example embodiments described below with reference to FIGS. 3A-3K and 4A-4I. In all of these scenarios, the user starts the encryption process at block 202 by running an example security application to generate the encrypted data.

In a first scenario, the application accesses text or an attached file on the mobile device at block 204. For example, the security application may have access, through a file sharing utility, through a file management utility, or through one or more application program interfaces (APIs) of one or more other applications running on the mobile device, to a text file, a photograph and/or a media or other type of file stored on or available to the mobile device. The user may also enter text or other data directly into the application, using available data entry utilities such as a voice-to-text utility, a handwriting recognition utility, a hardware keyboard, or a soft keyboard utility. Any of these utilities may be modified to process encryption and decryption commands, to authenticate users and to set access restrictions on the encrypted data and, thus, may be used as security applications. Block 206 may encrypt the directly entered text, encrypt text extracted from the file for encryption, or may encrypt the entire file. At block 212, the application converts the encrypted file to a distribution format, referred to herein as a "package," "data package," "formatted package," or "encrypted package." As described below, the encrypted package may then be distributed in at least three different ways. As shown in block 214, the user may instruct the security application to send the package directly to a third party application for distribution (e.g. via the API of the third party application, via a file sharing utility of the mobile device operating system or via a file management utility of the mobile device operating system). Alternatively, as shown in Block 216, the user may drag and drop the package into the third party application for distribution. As another alternative, the user may cause the security application to copy the encrypted package to the clipboard of the mobile device and then, after running the third party application, paste the encrypted package from the clipboard into the third party application. Many mobile devices employ temporary clipboard data buffer which are used for temporary data storage and/or for transferring data among applications. The clipboard buffer may be accessed, for example, using an operation system interface on the mobile device.

In a second scenario, the security application may receive text data entered by the user using a security soft keyboard of the security application as shown at block 208. The security soft keyboard may replace or augment a soft keyboard that is available for use by the applications running on the mobile device. As described below, in this scenario, the entered text may be encrypted in block 210 and distributed, as set forth above with respect to the description of blocks 212, 214, 216, 218, and 220.

The example scenarios all encrypt text, media data (e.g. pictures, videos or audio files), or other data into an encrypted package and provide the encrypted package to the security application for distribution to one or more third party applications. In the materials that follow, the data prior to encryption is referred to as "clear data" to distinguish it from the encrypted data. The clear data may be encrypted using an encryption engine operating according to one or more of a number of encryption algorithms such as symmetric key cryptographic algorithms (e.g. advanced encryption standard (AES), data encryption standard (DES), triple-DES, etc.) and/or asymmetric algorithms such as public key cryptographic algorithms (e.g. Rivest-Shamir-Adleman (RSA) or digital signature services (DSS)) or other encryption algorithms such as Diffie-Hellman and Elliptic Key or a one-time pad algorithm. It is contemplated that multiple encryption algorithms may be combined. For example, a symmetric key used for a symmetric encryption algorithm may asymmetrically encrypted and retrieved by a user or exchanged among users using the asymmetric algorithm. When an asymmetric algorithm is used, the system 100, shown in FIG. 1, may also include a key server (not shown) through which the users may obtain public keys used to encrypt and decrypt data. In an embodiment, the key server may be represented by the cloud server 112. The key server may operate on the same machine as another cloud server 112 used by an embodiment system or may be a separate cloud server 112 (e.g., different cloud servers perform different functions).

The third-party application to which the encrypted package is distributed may be, for example, a social media application, a cloud storage application, an e-mail application, a messaging application or other application that uses text or media files. The encrypted package may be accessed by the third party application in the same way that text or media files are accessed. As described below with reference to FIGS. 4A through 7C, the encrypted package may be decrypted using the example security application, which may be implemented as a security soft keyboard, and then processed as clear data by the third party application. For example, a user may encrypt a personal document for secure storage on a cloud server. Alternately, a user may encrypt media data such as a personal photograph and/or short video clip and share the encrypted package with trusted users via an email or social media application.

The examples below describe the security application, including the security soft keyboard, used in a messaging application to encrypt content to be added to a message and/or to decrypt encrypted content from a message. It is contemplated that the security application and/or security soft keyboard may be used to encrypt/decrypt content for other types of applications, for example, cloud storage applications, social media applications, or any other type of application that may communicate or store data.

Figure 3E:
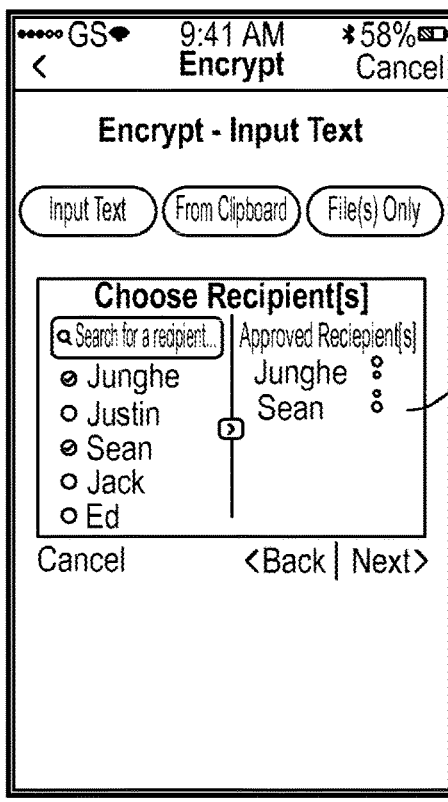

FIGS. 3A, 3B, 3C, 3D, 3E, 3F, 3G, 3H, 3I, 3J, and 3K are user interface diagrams useful for describing a first example encryption scenario. To begin the encryption process, the user first opens the security application as shown in FIG. 3A. The security application includes two options, "Encrypt" 302 and "Decryption from Clipboard" 304. In this example, the user selected the Encrypt option 302. FIG. 3B shows an example screen that may be displayed in response to the selection of the Encrypt option. The screen in FIG. 3B includes three soft buttons, an Input Text button 306, a Copy from Clipboard button 310, and a File Attachment button 312. In the example shown in FIG. 3B, the user has selected the Input Text button so the screen displays a text box 308 in which the user may enter text by any means available on the mobile device. For example if the mobile device has a handwriting recognition function the user may write the message in the box 308 using a fingertip or stylus. Alternatively, the user may tap the text box 308 to activate a soft keyboard (not shown) and use the soft keyboard to enter text into the text box 308. The entered text becomes the clear data for the security application.

FIG. 3C shows a screen that allows a user to encrypt content from a clipboard. The user may make this selection by pressing the "From Clipboard" button 310. In this instance text or files are pulled from clipboard (e.g. text or files that were cut/copied from another application) as the clear data for the security application.

FIG. 3D shows a screen that may be displayed by the security application when the user activates the File Attachment soft button 312. In the example shown in FIG. 3D, the user can choose from either local storage, such as the photos 314, or other local file storage application (not shown) or from a cloud service (e.g. OneDrive® 316, Google Drive® 318, or other cloud storage application). In this instance, the file retrieved by the security application is the clear data. Using one of the cloud file options 316 or 318, a user may download a file from a cloud service by selecting the file from a display box 319, encrypt the file, upload the encrypted file back to the cloud, and then send a link to cloud storage location for the encrypted to another user. After step 3D, the security application may encrypt the clear data to generate the encryption package.

Figure 3F:
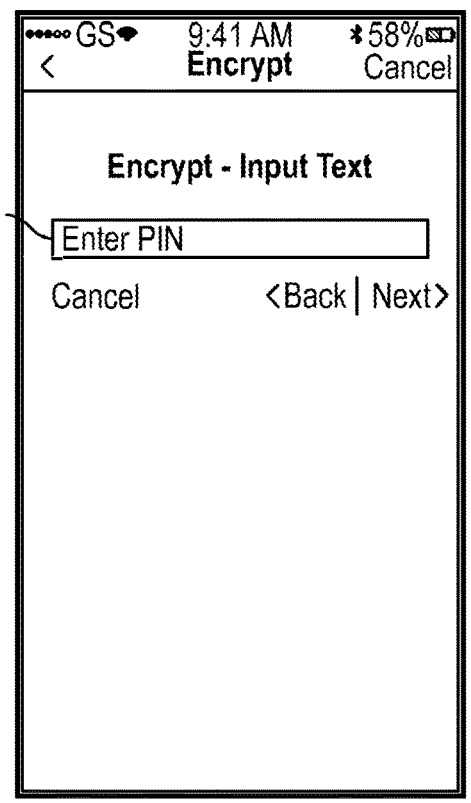

After generating the encryption package, the user can limit who is able to access the package as shown in FIG. 3E, by choosing permitted users, for example, from a contact list 322. As shown in FIG. 3F, the security application may ask the user to authenticate themselves for example by entering a password or pin code in box 324, providing biometric data, or by performing some other authentication method. In this step, a user may also specify restrictions for the encrypted file, for example, an expiration date expiration and/or restrictions on the user of the third-party application such as the ability to save or print the decrypted data.

Figure 3G:
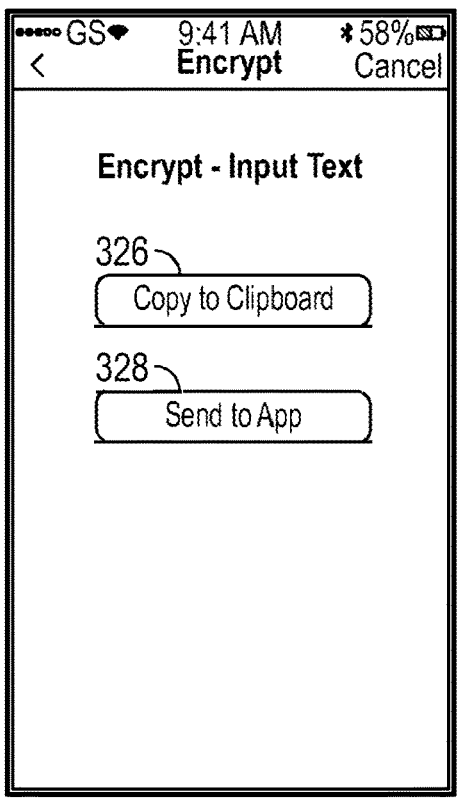
Figure 3H:
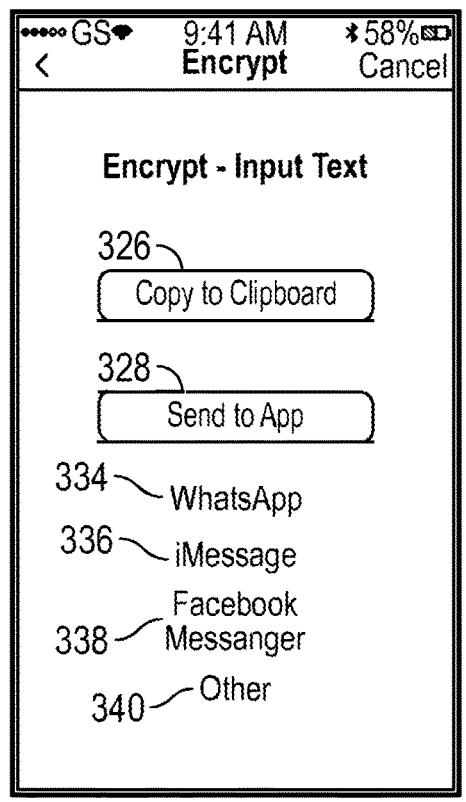

As shown in FIG. 3G, the user of the security application may select how the encryption package is to be processed by the application for distribution. In the example shown in FIG. 3G, the user has two options: Copy to Clipboard (soft button 326) which causes the security application to copy the encryption package to the clipboard, or to Send to App (soft button 328) to send the encryption package to a third-party application directly, for example via an API or through the mobile device operating system. When the user selects soft button 326, the encryption program places the encrypted package into the clipboard buffer of the mobile device. As shown in FIG. 3H, when the user selects the Send to App soft button 328, the security application displays a list of applications to which the package may be sent. The example shown in FIG. 3H, these applications include WhatsApp® 334, iMessage® 336, Facebook Messenger® 338, and Other 340. The specifically listed applications may use an API to distribute the encryption package. Selecting Other may, for example, cause the security application to display a list of all applications available to the mobile device to allow the user to select one of those applications through the operating system.

Figure 3I:
Figure 3J:
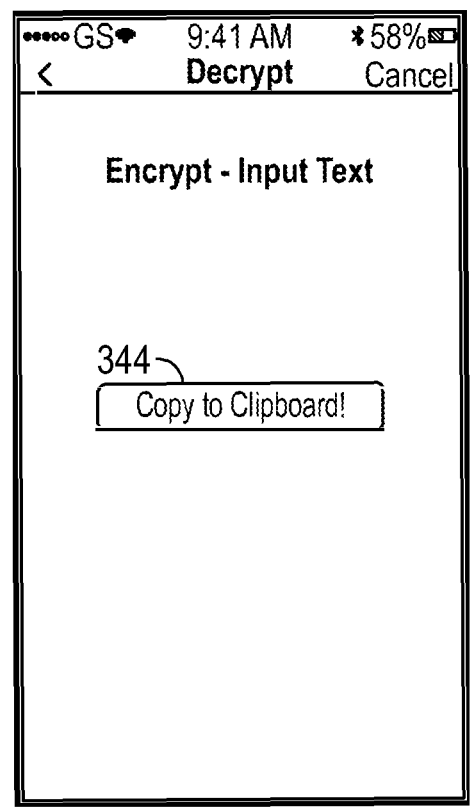
Figure 3K:
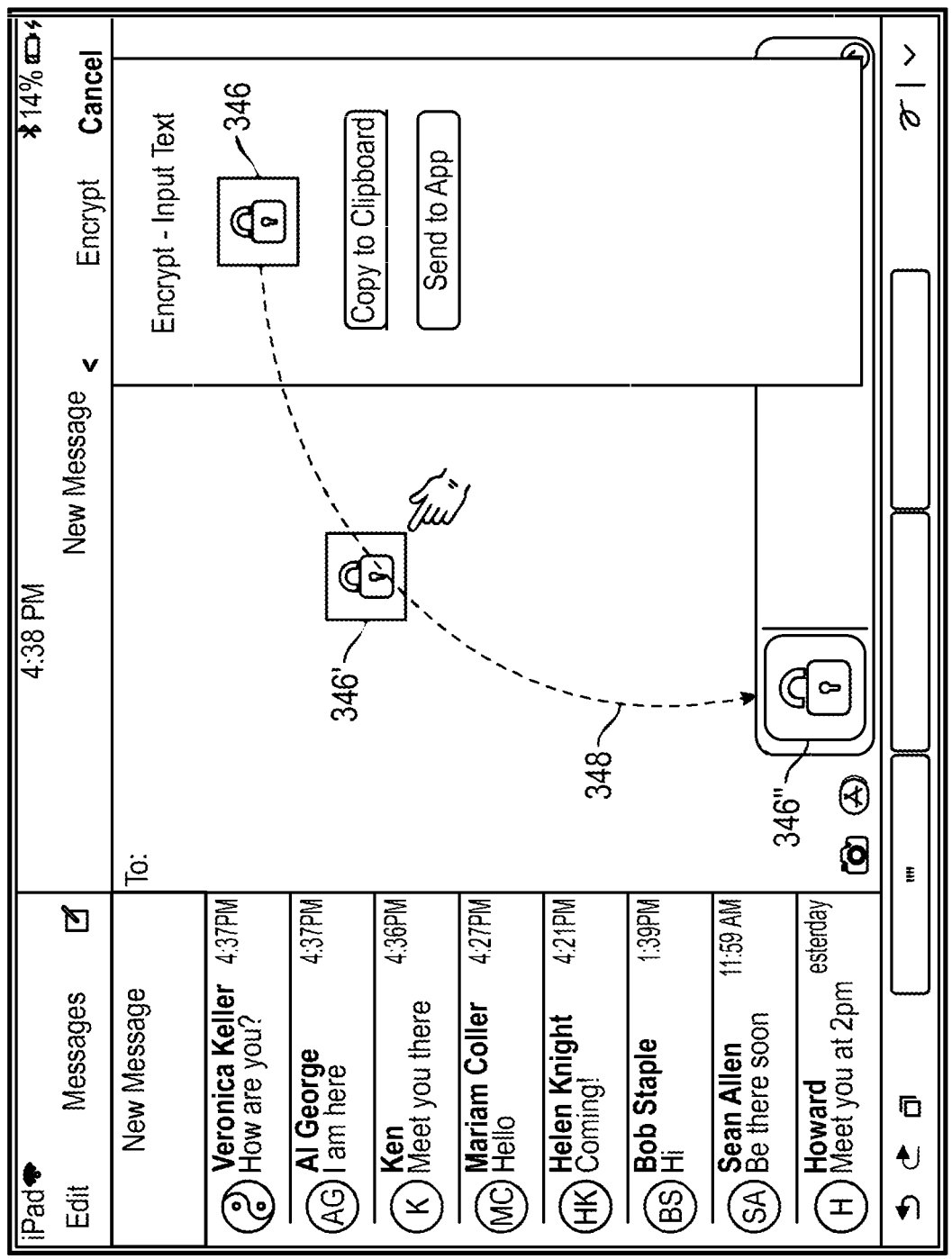

FIGS. 3I and 3J show the result of pressing the soft button 326 after pressing the button as shown in FIG. 3I, the security application confirms that the encrypted package has been copied to the clipboard as shown by the message 344 in FIG. 3J. Following the display of the message as shown in FIG. 3J, the user may open another application on the mobile device and paste the encrypted package into the other application from the clipboard. Alternatively, as shown in FIG. 3K, the user may drag the encrypted package 346 along the arc 348 as indicated by the encrypted package 346' into the third-party application, in this example, the messaging application, to attach the encrypted package 346" to the message.

Figure 4A:
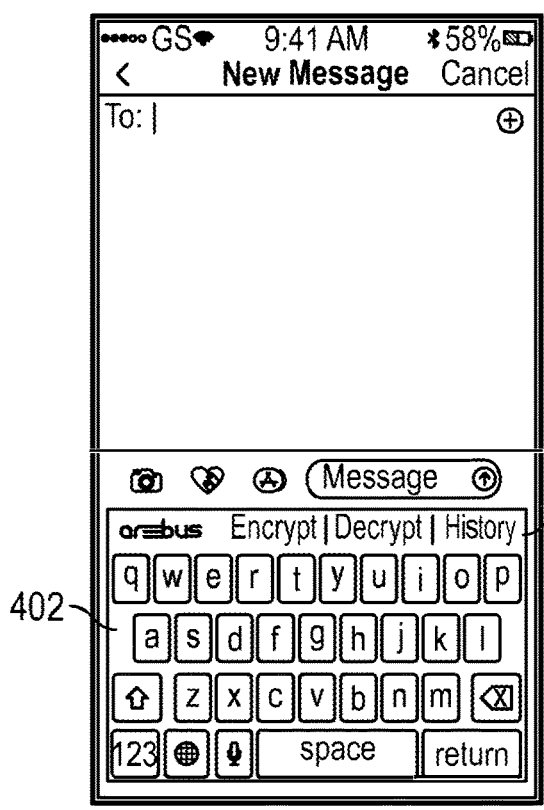
FIGS. 4A, 4B, 4C, 4D, 4E, 4F, 4G, 4H, and 4I are user interface diagrams useful for describing a second example encryption scenario.

FIGS. 4A, 4B, 4C, 4D, 4E, 4F, 4G, 4H, and 4I are user interface diagrams useful for describing a second example encryption method. In this example, a user of the messaging application opens a soft keyboard 402 of the security application, which is referred to herein as the security soft keyboard. This soft keyboard may, for example, replace the soft keyboard of the mobile device or be selected from the messaging application, for example, as one of the option settings. The example soft keyboard 402 may perform some or all of the functions of the security application. As shown in FIG. 4A, the security keyboard may include a toolbar 404 that allows a user to select Encrypt, Decrypt or History. Selecting Encrypt allows a user to generate an encrypted package, selecting Decrypt allows the user to decrypt an encrypted package and selecting History allows the user to obtain an historical list of previously encrypted or decrypted packages and change the previously granted permissions including revoking permissions from previously encoded packages. The keyboard shown in FIG. 4A is only one example configuration. Alternatively, the toolbar 404 may be displayed above the standard soft keyboard of the mobile device or adjacent to a soft keyboard provided by the manufacturer or distributor of the mobile device or by a third party to implement the security application. In another alternative, the Encrypt, Decrypt, and/or History functions may be activated in other ways, for example by adding keys to the soft keyboard of the mobile device.

Figure 4B:
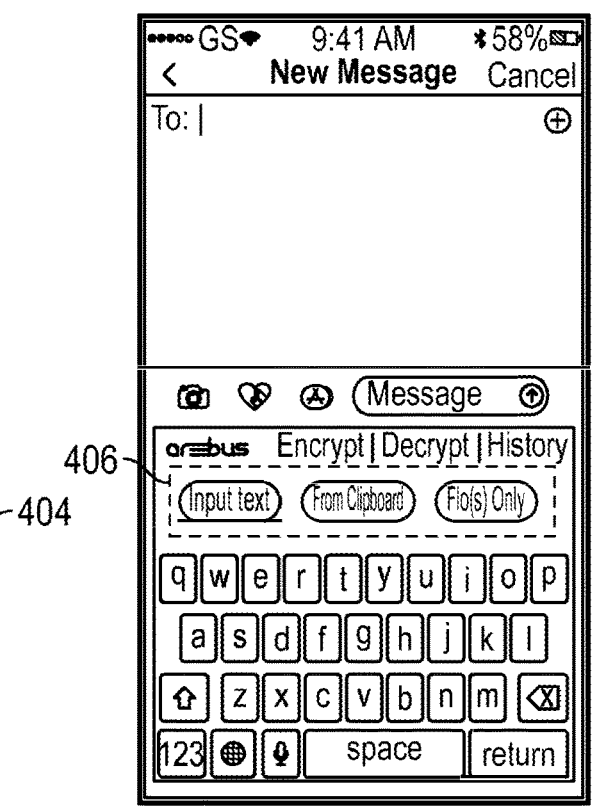
Figure 4C:
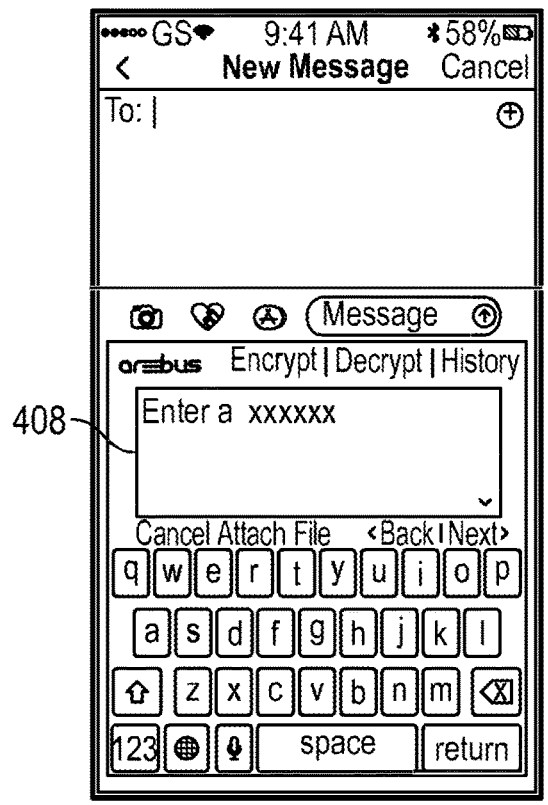

When the user selects the Encrypt function in the screen shown in FIG. 4A, the security application, as shown in FIG. 4B, may display three soft buttons, "Input Text," "From Clipboard," and "File(s) Only" as shown in dashed line box 406. These buttons have the same function as the soft buttons 306, 310, and 312 described above. The buttons in dashed line box 406 allow a user to enter text directly, copy text or other clear data from the clipboard or receive the clear data from one or more files. When, for example, the user selects "Enter Text," and begins to type on the soft keyboard 402, the mobile device displays the text being typed in a text box 408, as shown in FIG. 4C. The user may also select a file for encryption by activating the "select file" button below the text box 408. In this instance, file selection will proceed as described below with reference to FIG. 4D.

Figure 4D:
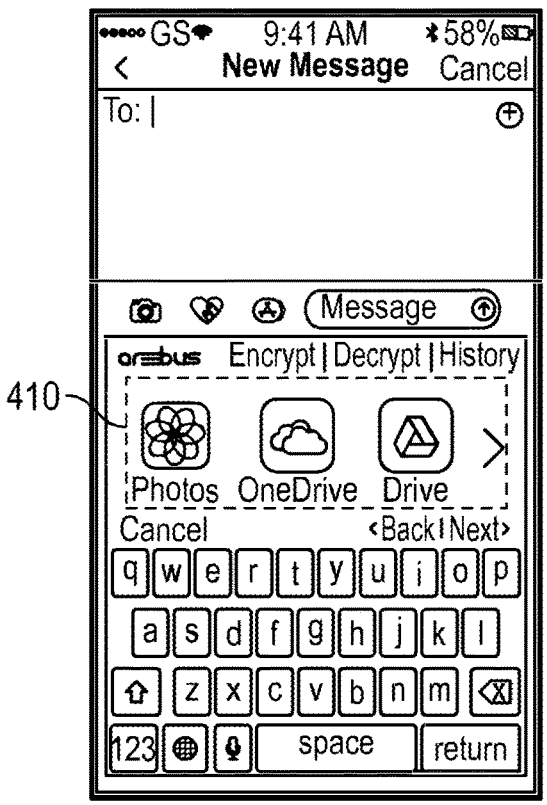

FIG. 4D shows the response of the security application to selecting the "File(s) Only" button in box 406. In particular security soft keyboard may display, in block 410, a set of target applications including a photo application and two cloud storage applications. After a particular application is selected, files available to that application may be displayed in the window 410 in place of the listed applications, allowing the user to choose one or more files from the files available to the particular application using an API for that application. As indicated by the arrow at the right side of block 410 the user may access other applications from which the clear data file to be encrypted. The files available to these applications may be accessed through the operating system as described above with reference to FIG. 3H.

Figure 4E:
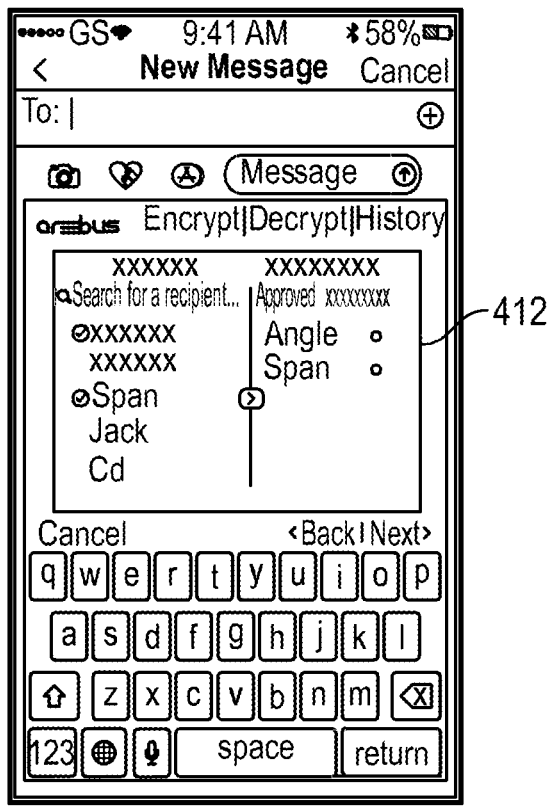
Figure 4F:
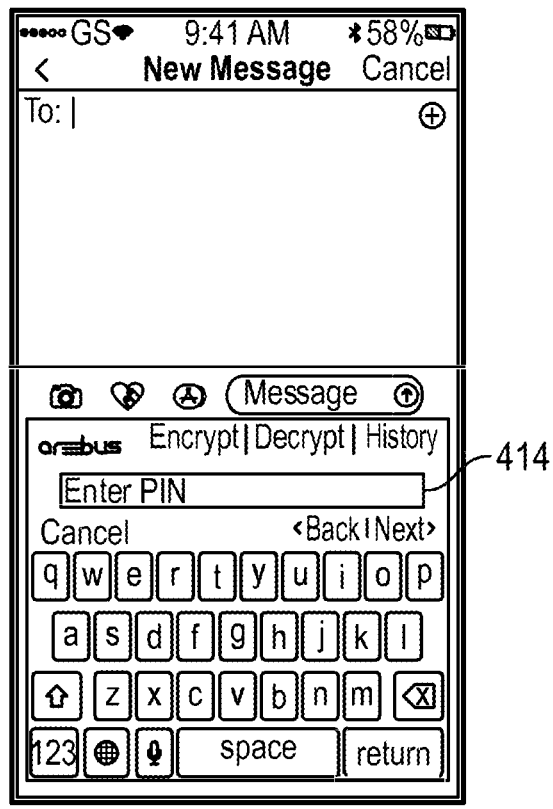
Figure 4G:
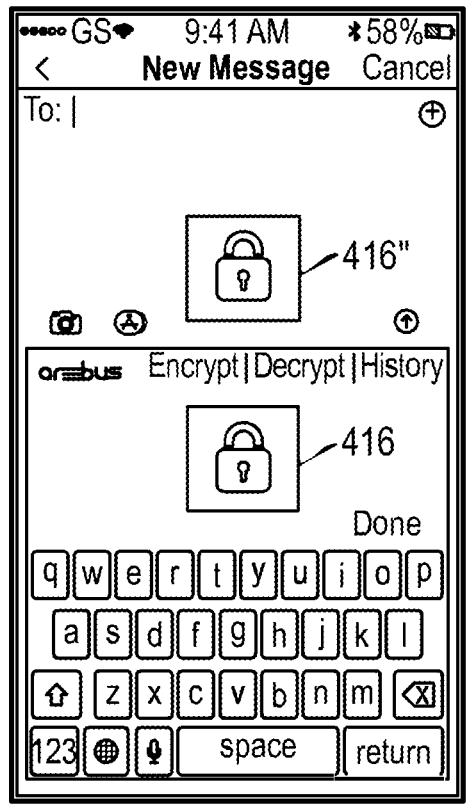

After the clear data has been entered or selected, the security application allows the user to select one or more recipients and set the permissions for each recipient as shown by block 412 of FIG. 4E and as described above with reference to FIG. 3E. In FIG. 4F, the user enters the authentication data. When the recipient of the message has been entered and the user authenticated, the security application may transfer the encrypted package 416 directly to the messaging application as shown in FIG. 4G by the transferred message 416'.

Figure 4H:
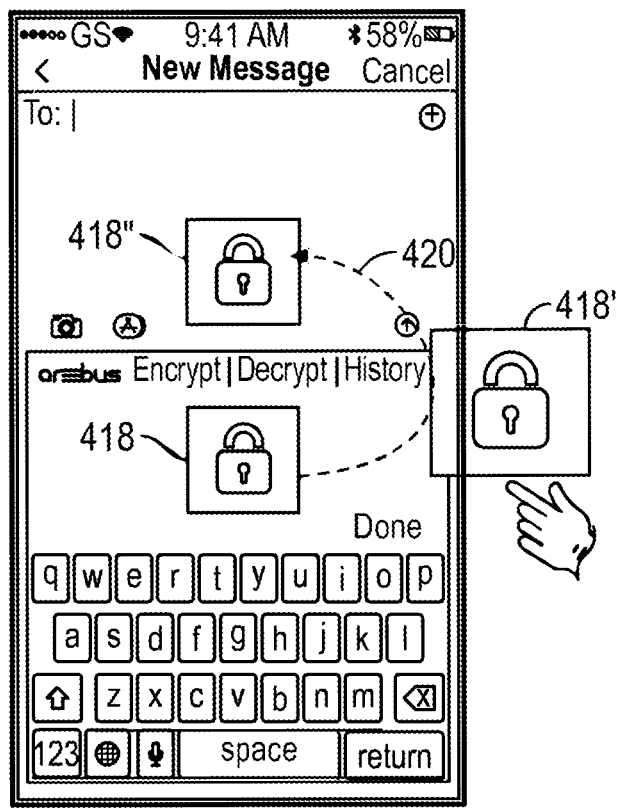
Figure 4I:
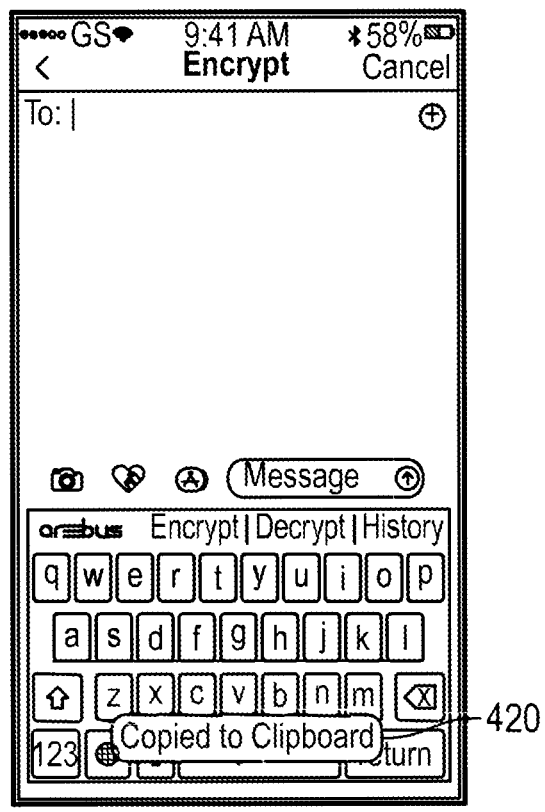

Alternatively, as shown in FIG. 4H, the user may drag and drop the encrypted package 418 from the security application to the messaging application along curve 420 as shown by the intermediate and final security applications 418' and 418". FIG. 4I illustrates another delivery message in which the security application automatically copies the encrypted package to the clipboard and displays a message 420 indicating that the package has been copied. The user can then paste the encrypted package into the messaging application and/or into another application.

The examples described above concern the generation and distribution of an encrypted package. The examples described below, with reference to FIGS. 5A through 7C describe how an encrypted package is decrypted and how the encrypted contents are displayed. All of these examples assume that the encrypted package is available in the security application either by the encryption package being copied from the clipboard, pulled directly from the messaging application, or by dragging and dropping the encryption package from the messaging application to the security keyboard or security application (described below with reference to FIGS. 7A-7C). FIGS. 5A, 5B, 5C and 5D are user interface diagrams useful for describing a first example decryption method in which the recipient of encrypted package shares the package with the security application in order to decrypt the package to obtain the clear data.

As shown in FIG. 5A, the user opens the third-party application which displays either the security soft keyboard, the standard keyboard with the security application toolbar 502 or a custom soft keyboard with dedicated keys for performing the encryption, decryption and history functions. The keyboard and/or toolbar 502 may be displayed in response to the user selecting an encrypted package (not shown) from the message area 503 of the example messaging application. Alternatively, the user may copy the encrypted package to the clipboard and when the user selects the decrypt button the keyboard pulls the encrypted package from the clipboard.

Next, as shown in FIG. 5B, the user of the messaging application authenticates their use of the security application for example by entering a password or pin code, or by performing biometric authentication. Once the user is authenticated, the encryption package is decrypted and displayed in block 506 as shown in FIG. 5C. As an alternative to selecting the encrypted package from the message 503 to invoke the security application/soft keyboard, a user may drag and drop the encryption package 508 along the arc 510 from the message area 503 to the security application/soft keyboard as shown by the intermediate and final encrypted packages 508' and 508". After the operation shown in FIG. 5D the decrypted content may be displayed as shown in FIG. 5C.

Figure 6A:
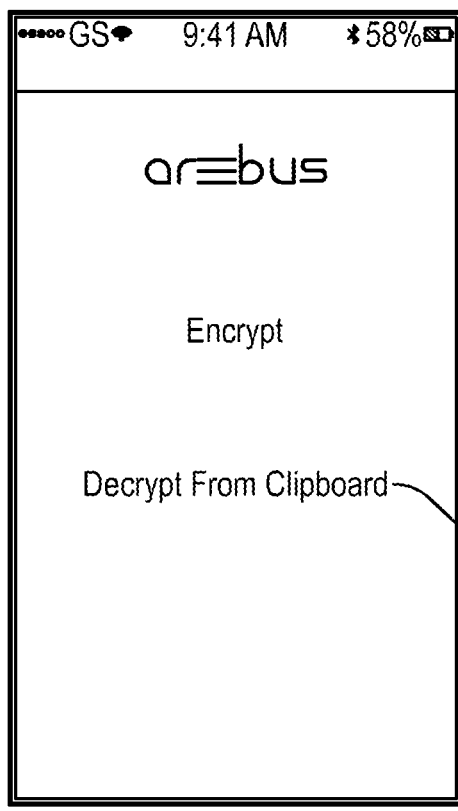
FIGS. 6A, 6B and 6C are user interface diagrams useful for describing a second example decryption scenario.
Figure 6B:
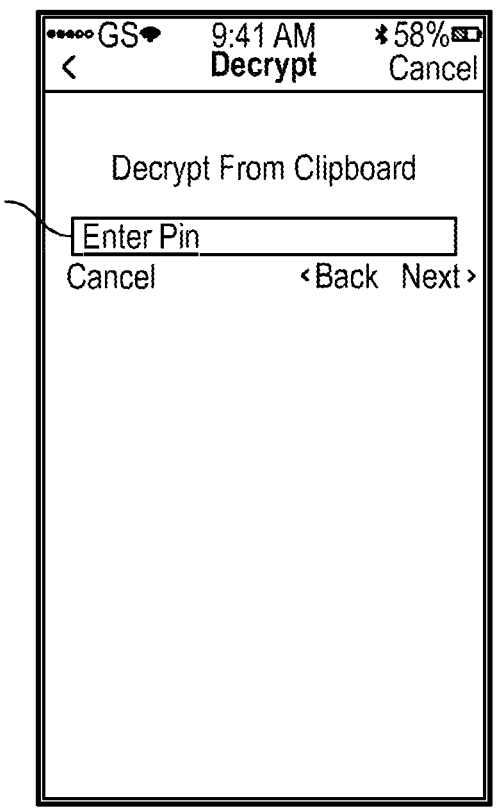
Figure 6C:
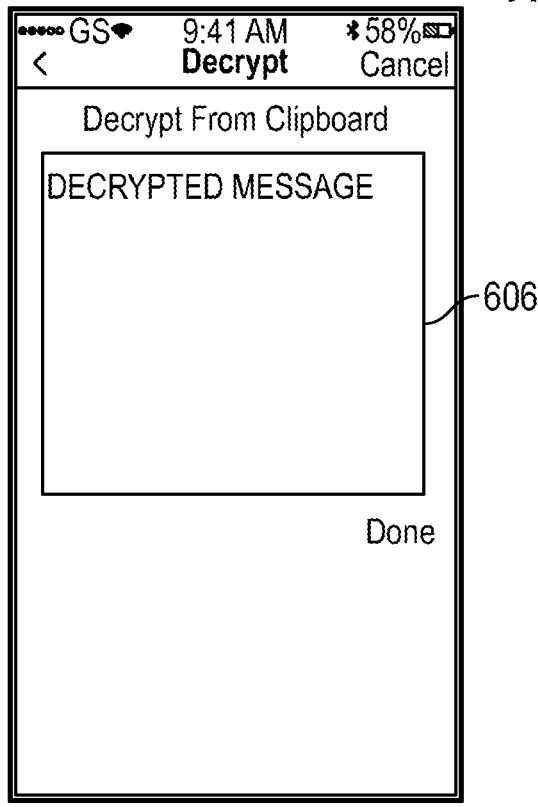

FIGS. 6A, 6B, and 6C are user interface diagrams useful for describing a second example decryption method. In this method, the mobile device displays the opening screen of the security application as shown in FIG. 6A. This is the same screen as shown in FIG. 3A. In this instance, however, the user commands the security application to Decrypt from Clipboard 602. The security application, as shown in FIG. 6B, then requests authentication 604 as described above with reference to FIGS. 4F and 5B, and when the user has been authenticated, the application displays the decrypted clear data 606 as shown in FIG. 6C.

Figure 7A:
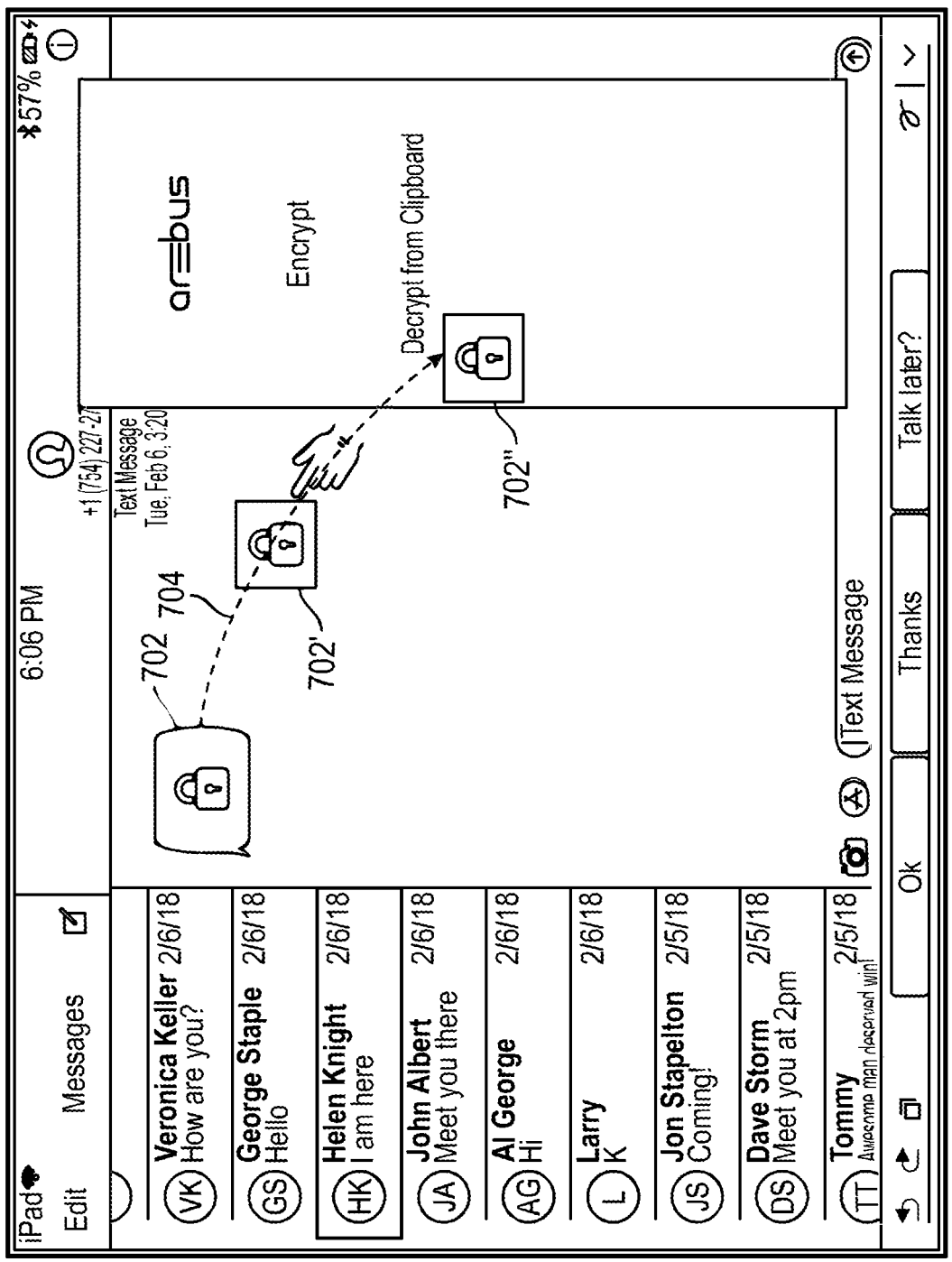
FIGS. 7A, 7B and 7C are user interface diagrams useful for describing a third example decryption scenario.
Figure 7B:
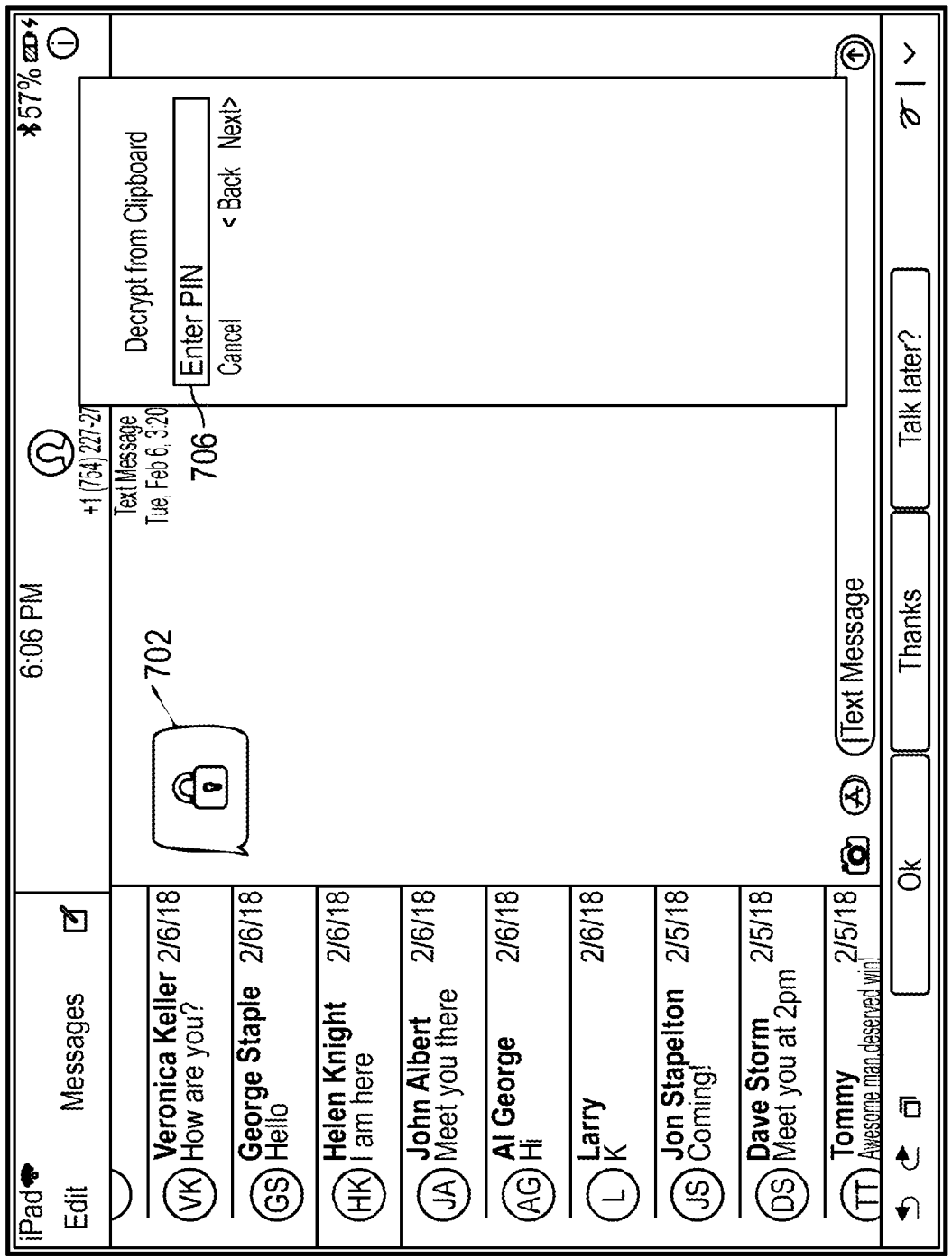
Figure 7C:
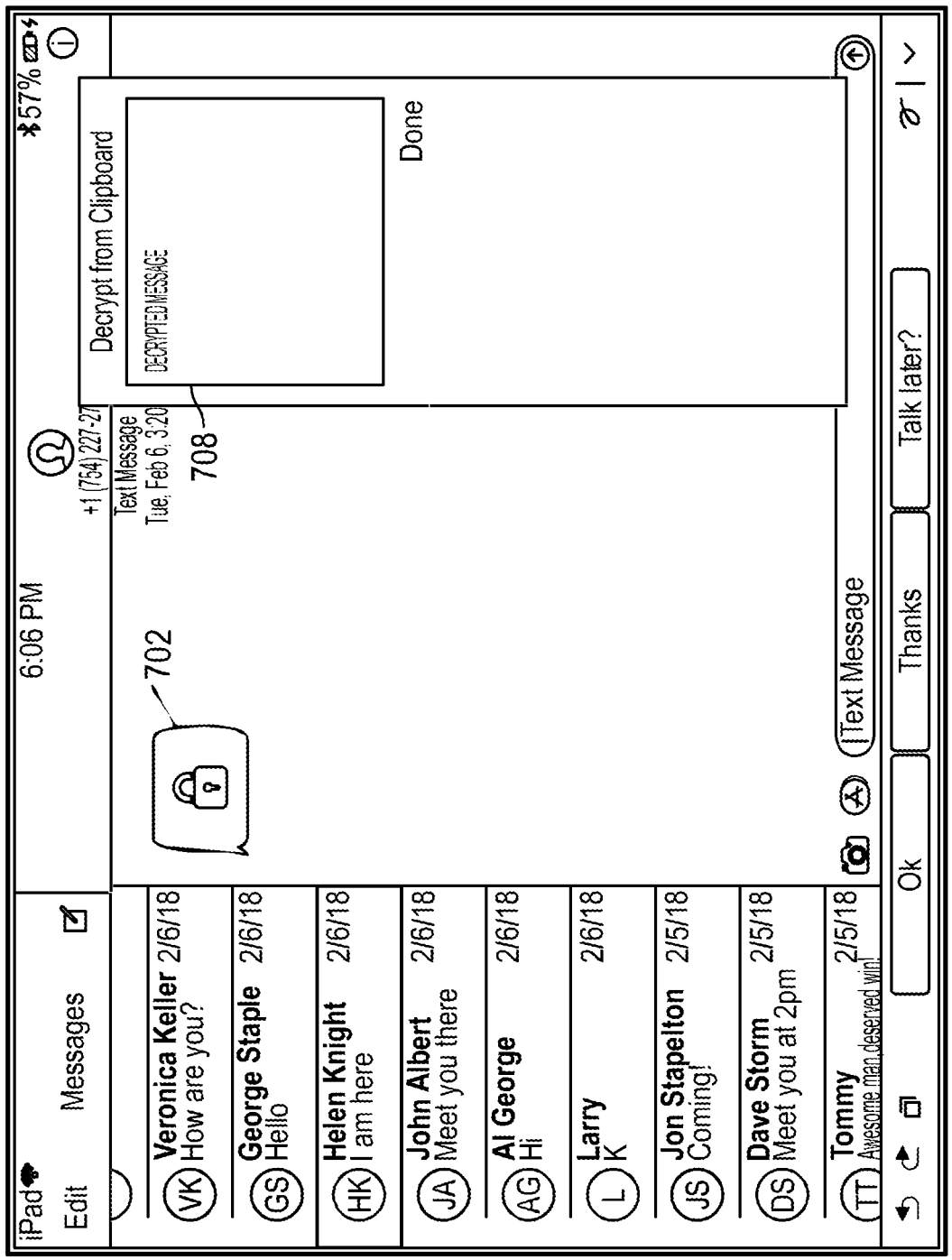

FIGS. 7A, 7B, and 7C are user interface diagrams useful for describing a third example decryption scenario. As shown in FIG. 7A, the user opens the security application along with the messaging application. The user then drags and drops the encrypted package 702 along the arc 704 as indicated by the intermediate encryption packages 702' and 702". In response to dropping the encryption package 702" in the security application as shown in FIG. 7A, the security application requests authentication information 706 from the user as shown in FIG. 7B. Once the user is authenticated, the encryption package is decrypted and the clear data is displayed from the security application as shown by block 708 of FIG. 7C

Figure 8:
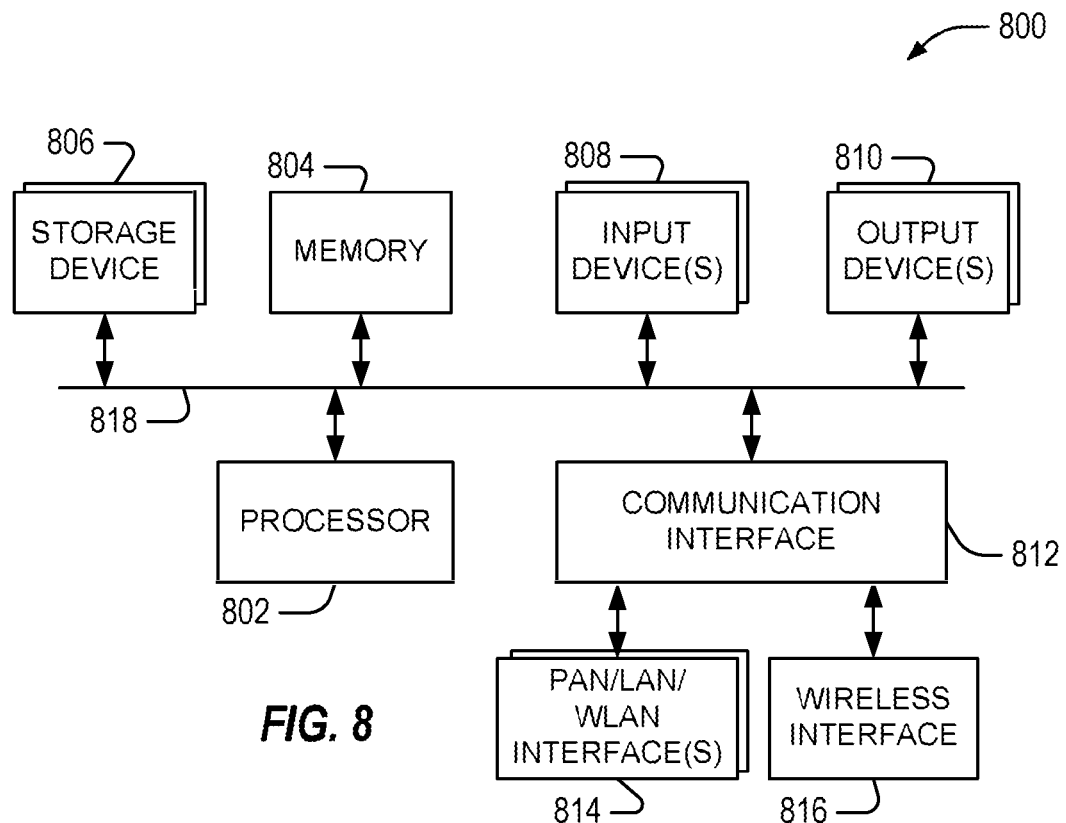
FIG. 8 is a block diagram of an example server system.

FIG. 8 is a block diagram of an example processing system 800 that may be used as any of the servers 110, 112 and/or 114, shown in FIG. 1. The system 800 includes a processor 802 coupled to a bus 818. Also coupled to the bus 818 are a storage device 806 (e.g. a flash memory device); a memory 804, which may include random access memory (RAM) and read only memory (ROM); one or more input devices 808 (e.g. a keyboard, a touchscreen, a microphone, etc.); one or more output devices 810 (e.g. a display screen, a speaker, etc.) and a communications interface 812 to provide communication between the system 800 and other systems as described above with reference to FIG. 1.

The memory 804 may store computer instructions for applications that are currently running on the system 800. The storage device 806 may be a database. In a cloud storage server, for example, the storage device 806 may hold the encrypted user files, described above.

As shown in FIG. 8 the communications interface may be coupled to a wide area network (WAN), for example, the Internet, a personal area network (PAN), a local area network (LAN), a wireless LAN (WLAN) interface such as a wired or optical Ethernet connection and/or a wireless connection (e.g. IEEE 802.11, IEEE 802.15, etc.). In addition the communications interface 812 may be coupled to a wireless interface such as a 3GPP mobile device interface. The interfaces 814 and 816 may be coupled to respective transceivers and/or modems (not shown) to implement the data communications operations.

Processor 802 may include a microprocessor, microcontroller, digital signal processor (DSP) that is configured to execute commands stored in the memory 804 corresponding to the programs (Internet browsers, application program interfaces (APIs), dynamically linked libraries (DLLs), applications (APPs), etc.) described above. The memory 804 may also store temporary variables or other information used in the execution of these programs. The programs stored in the memory 804 may be retrieved by the processor from a non-transitory machine-readable memory, for example, the storage device 806, or from other non-transitory media such as a CD-ROM, digital versatile disk (DVD), etc.

Figure 9:
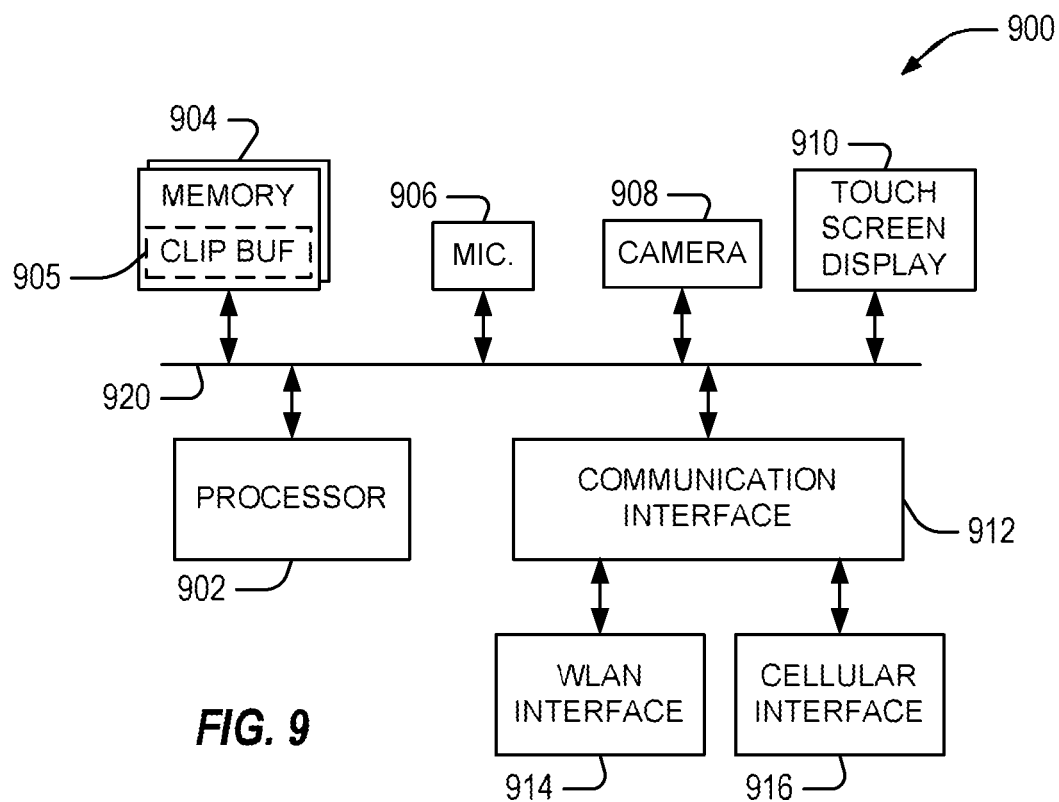
FIG. 9 is block diagram of an example mobile device.

FIG. 9 is a block diagram of an example processing system 900 that may be used as any of mobile devices 202 and 204, shown in FIG. 1. The system 900 includes a processor 902 coupled to a bus 920. Also coupled to the bus 920 are a memory 904, which may include a flash memory device, random access memory (RAM) and/or read only memory (ROM); a microphone 906, a camera 908, and an input/output device 910, such as a touch screen display. The bus 920 also connects the system 900 to a communications interface 912 to provide communication between the system 900 and the cellular wireless network 106 and/or the Wi-Fi network 116 shown in FIG. 1.

The memory 904 may store computer instructions for applications that are currently running on the system 900 and may include the clipboard buffer 905. The communications interface 912 may be coupled to a wireless LAN (WLAN) interface 914 such as a wireless connection (e.g. IEEE 902.11, IEEE 902.15, etc.). In addition the communications interface 912 may be coupled to a wireless interface such as a 3GPP mobile device interface 916. The interfaces 914 and 916 may be coupled to respective transceivers and/or modems (not shown) to implement the data communications operations.

Processor 902 may include a microprocessor, microcontroller, digital signal processor (DSP) that is configured to execute commands stored in the memory 904 corresponding to the programs (Internet browsers, application program interfaces (APIs), dynamically linked libraries (DLLs), applications (APPs), etc.) described above. The memory 904 may also store temporary variables, the clipboard, or other information used in the execution of these programs. The programs stored in the memory 904 may be retrieved by the processor from a separate physical memory, for example, a flash memory device, a CD-ROM, digital versatile disk (DVD), etc.

Figure 10:
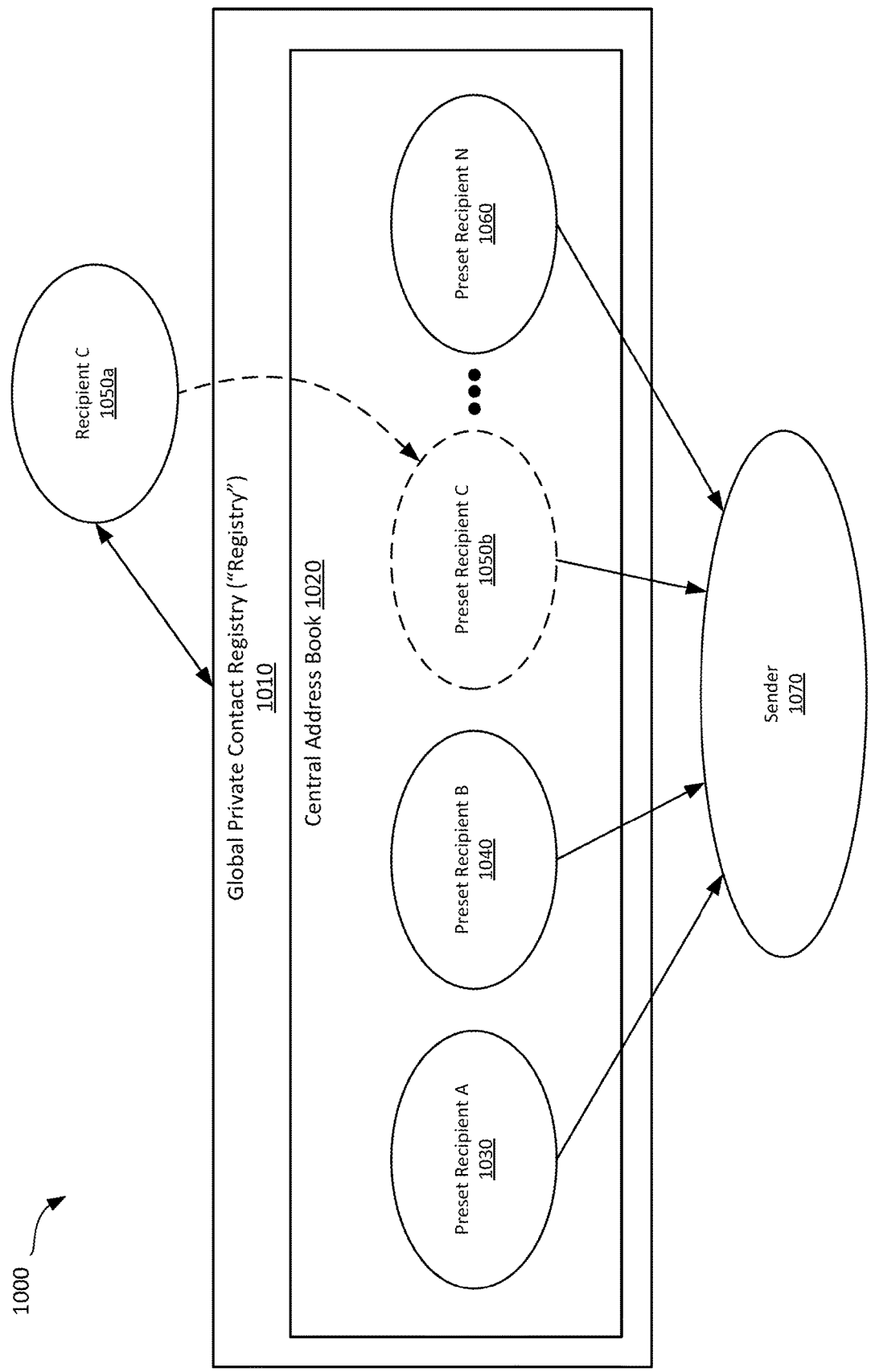
FIG. 10 is a block diagram of a global private contact registry.
Figure 11:
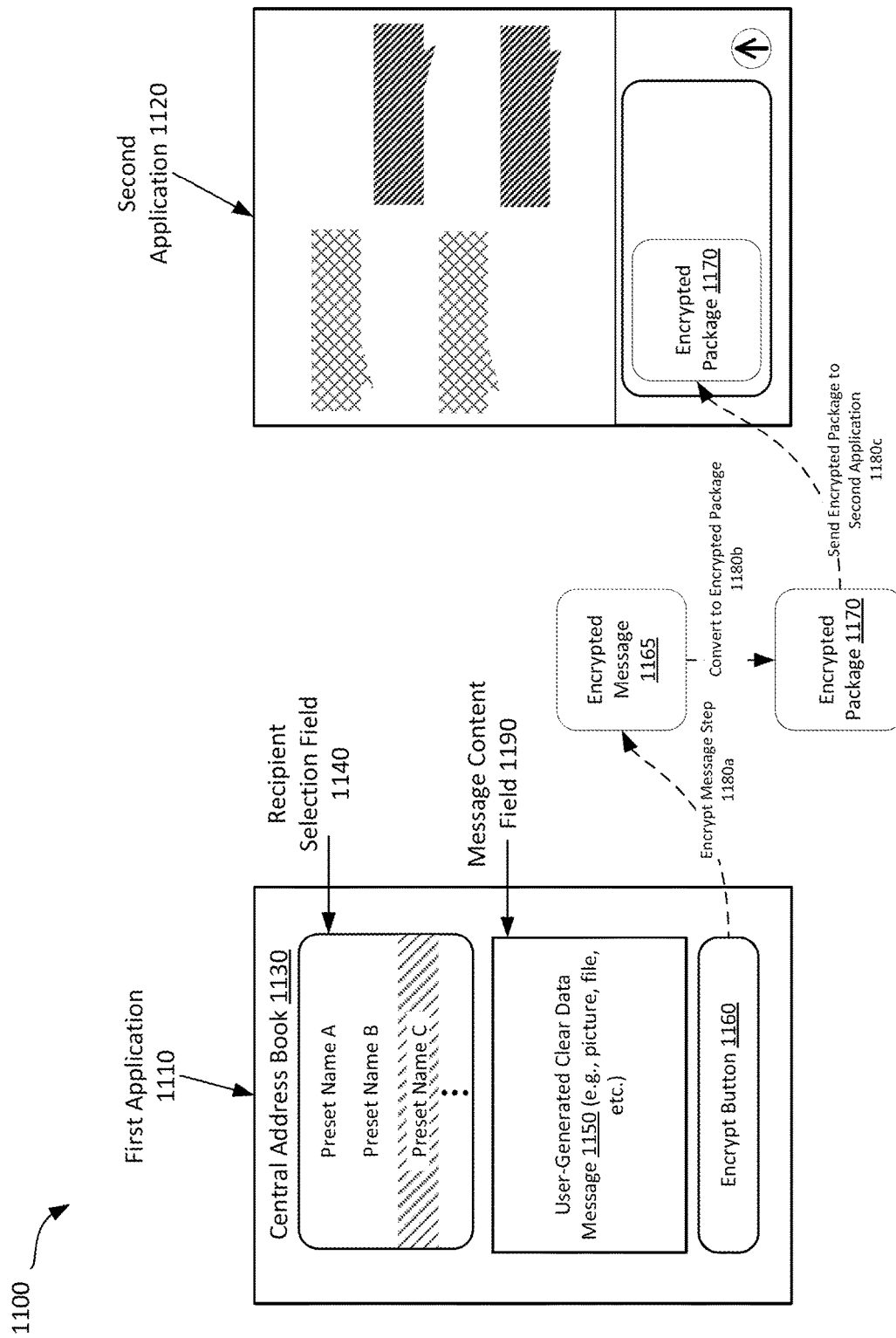
FIG. 11 is a user interface diagram useful for describing a first example central address book use-case scenario.
Figure 12:
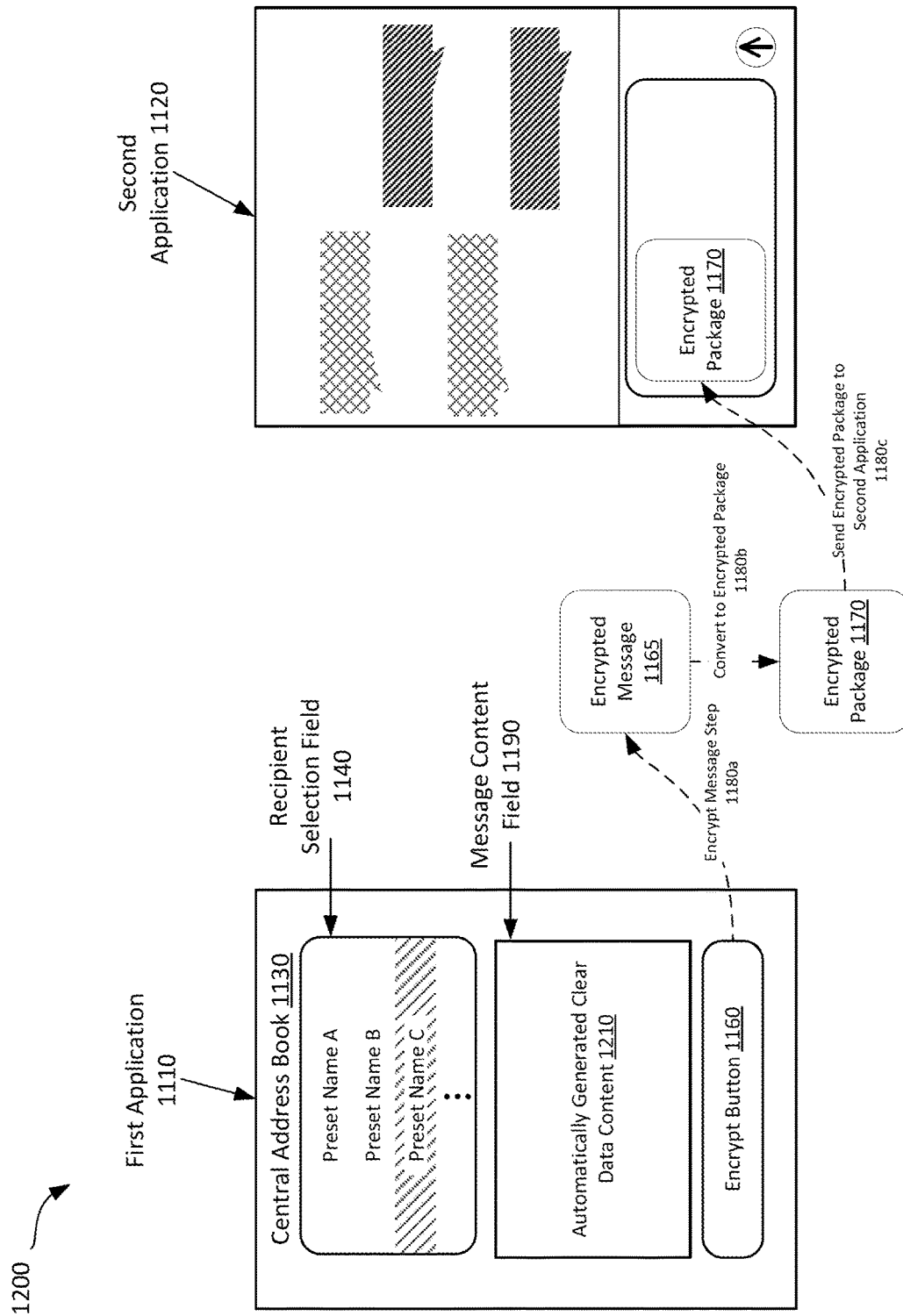
FIG. 12 is a user interface diagram useful for describing a second example central address book use-case scenario.

FIGS. 10, 11, and 12 illustrate and describe how the above-discussed systems and methods may be used in conjunction with a global private contact registry (registry).

FIG. 10 is a block diagram of a global private contact registry. The registry 1010 may be made up of one or more systems that save, send, and/or receive information that is used by the registry 1010. The registry 1010 is two-sided and facilitates private information transfer. The registry benefits senders and recipients due to the ability to preserve privacy by providing anonymized sender and recipient addresses, secure communications via encrypted files, and the ability to send monetary funds without sharing personal identifiable information.

One side of registry 1010 is recipient focused. The recipient-focused side of the registry contains an interface that provides recipients with a method to register and maintain information about how they (the future recipient of a message, package, etc.) can be contacted. The interface used by recipients may be a website, API, toll-free phone support, or any other way in which the recipient can communicate information to the registry itself, or to someone or something that can then communicate the information with the registry. In some embodiments, a recipient can use the registry interface to add, modify, or remove information associated with the recipient, the information could contain contact information, preferred methods of contact, services, automated methods of contact, automated message content, re-encryption keys, public keys, and/or data formats they accept. In some embodiments, the recipient can use the registry interface to restrict the messages they receive (e.g., who they are willing to receive messages from (allow-list and/or deny-list), countries or regions they are willing to accept messages from originating within, domains used to send a message, IP address a message originates from, whether a sender is anonymous, whether the sender is registered as an individual or entity, etc.). In an embodiment, the recipient can control the content of the message they receive using the registry interface (e.g., require that a monetary value is included, require that the sender's contact information is shared, require that the sender is anonymous, require a particular message format, clear data format, transcoding requirements, supported transcoding methods, etc.). The recipient may be a person, entity, government, business, charity, etc. (e.g., service support, suicide-prevention-hotline, donation service, family crisis center, etc.). Further, a recipient may also be required to share with the registry what services, reasons, and/or purposes they may be contacted for (e.g., technical support, suicide prevention near me, donations for a particular cause, domestic violence hotline, etc.). In some embodiments, a recipient may not be required to provide anything to the registry besides at least a communication method by which they may be contacted (e.g., email, shared file location, messaging application, social media application, etc.). In some embodiments, a recipient provides at least one key to the registry (e.g., public key, re-encryption key, etc.) during a registration process with the registry. The registry 1010 may contain a central address book 1020 with preset/registered recipient information. The central address book 1020 can contain any number of preset recipients. Additionally, in some embodiments, the registry provides recipients with an interface to create or modify one or more methods, where the methods allow for certain communication characteristics from senders to recipients to be automated (e.g., content of the clear data, preferred form of communication method, encryption key(s), etc.).

As an example, illustrating the use of the recipient-focused side of registry 1010, a recipient C 1050a may wish to be onboarded/registered in the registry 1010. The recipient C 1050a need only provide at least one way they can be contacted (e.g., contactable by email at a particular email address). However, the recipient may additionally, or alternatively, provide other ways in which they can be contacted, such as through a social media application, or cellular communication. The recipient C 1050a may also provide services they offer, such as a domestic violence hotline. Once the recipient has provided at least the required information for registering with the registry 1010, they may then become a preset recipient (e.g., preset recipient C 1050b) in a central address book 1020 of the registry 1010.

As a further example of how the recipient-focused side of the registry may be used, an entity such as a crisis hotline may provide a method that allows a clear data message to be automatically generated by a user device and sent to the recipient (e.g., a crisis hotline could provide a single button to initiate an SOS call with important information which is automatically included in the private communications, like the sender's location).

The second side of the registry 1010 is an interface to provide senders a way to choose from preset recipients for sending encrypted packages to. A sender 1070 may be an individual user or may be an entity. In some embodiments, the sender 1070 may be able to search for particular preset recipients in the central address book 1020. In some embodiments, the sender 1070 may be able to filter for recipients based on information associated with the preset recipients (e.g., location, distance away, services offered, alphabetically, most popular, available communication methods, etc.). Further, the central address book 1020 may contain public and private preset recipients wherein some recipients in the central address book 1020 are only presented to certain senders based on the sender's identity. For example, a sender 1070 may be registered as an entity and therefore may be able to see preset recipient A 1040, when a different sender who is an individual cannot.

In an example, sender 1070 is located in a certain area and therefore the sender-registry interface allows for the presentation of preset recipient B 1040 to the sender 1070 (possibly because the preset recipient B 1040 is in the same general location at the sender 1070).

FIG. 11 is a user interface diagram useful for describing a first example central address book use-case scenario. The examples below describe how in conjunction with the systems and methods described above, a user may generate and distribute an encrypted package to a preset recipient in a central address book that is maintained by a global private contact registry.

A first application 1110 that runs on a user device may be used to encrypt a user-generated clear data message 1150 intended to be received by a recipient from a central address book 1130. The first application 1110 may be launched by the user, may be opened by another application on the user device, or may open as a result of a user prompt on the user device. The first application 110 may interface with a computing service remote from the user device to provide different functionalities, including those of the central address book 1130. The computing service can implement a global private contact registry such as the one described in FIG. 10.

In an embodiment, the user may use the first application 1110 to interact with the central address book 1130 (e.g., via a user interface of the first application 1110). The user may or may not need to have an account associated with the first application 1110 (e.g., an account registered with the computing service). As already described, the central address book 1130 may contain recipient information (e.g., name, method(s) of contact, services offered, location, encryption key(s), etc.) and can be available in part or fully from the computing service. In an embodiment, the recipient information may only include anonymized recipient information and/or can exclude personal identifiable information (PII) (e.g., full legal names of recipients, physical addresses of recipients, network addresses of devices used by recipients, etc.)

In illustration 1100, the first application 1110 displays a list of the preset names of the preset recipients registered in the central address book 1130 within the recipient selection field 1140. However, one of ordinary skill in the art would recognize that any of the other information associated with the recipients may additionally, or alternatively, be displayed where the names are displayed in the recipient selection field 1140 (often, the displayed information helps a user of the first application 1110 identify the correct intended recipient). In an embodiment, a recipient is selected by default based on user preferences or based on information received by the first application 1110 when it was launched or brought into the foreground.

In an embodiment, information about the recipient that is shown in the recipient selection field 1140, or elsewhere, is not personal identifiable information. Thus, in an embodiment, the recipient selection field 1140 or another user interface of the first application 1110 does not show recipient name, contact information, type of device the recipient uses, application(s) that the recipient uses, method of contact for the recipient, the phone number of the recipient, etc. In an embodiment, the recipient is prevented from viewing information (e.g., name, contact information, type of device the sender used, application the sender used, how to respond directly to the sender, the phone number of the sender, etc.) about the sender who used the first application 1110. Further, one of ordinary skill in the art would recognize that there are many ways to present a list of recipient information to be chosen from in the recipient selection field 1140. For example, the recipient selection field 1140 may be scrollable with a defined end, may be an infinite scroll window, may be scrolled vertically or horizontally, may contain a search functionality, may be clicked in order to have a bigger name selection field appear, may use voice input to search, etc.

In an embodiment, the first application also contains a user-generated message content field 1190 where a user can place information to be sent to a selected recipient from the recipient selection field 1140. In an embodiment, the user may need to select a recipient before they may enter clear data content into the message content field 1190. In an embodiment, the user may select and recipient and enter clear data content into the message content field 1190 in any order they desire. In an embodiment, the message content field 1190 is populated with clear data information based on a prior application that was displayed on the device, prior user actions that led to the first application 1110 being displayed, etc. In an embodiment, message content field 1190 may allow for user input to be dragged and dropped into it. In an embodiment, the message content field may allow for a user to directly enter text, paste text, paste images, paste files, attach files, etc. to be included in the user-generated clear data message 1150. One of ordinary skill in the art would recognize that there are many ways in which a user may be able to add information into the message content field 1190 (whether the information is obtained from other file systems, applications, etc.)

The first application 1110 also contains an encrypt button 1160 that allows a clear data message to be encrypted for the intended recipient that was chosen in the recipient selection field 1140. In an embodiment, after clicking the encrypt button 1160, the clear data message contained within the message content field 1190 is encrypted at step 1180*a* using the preset contact information that is associated with the selected recipient chosen in the recipient selection field 1140 and converted to an encrypted package 1170 in step 1180*b* so the encrypted package 1170 may then be sent by using a second application 1120 (e.g., by using an encryption key associated with the recipient). The second application 1120 may be the same or a different application than the first application 1110. The process of encrypting a message 1180*a* and converting the encrypted message 1180*b* to an encrypted package 1170 that is in a compatible file format has already been described above. Further, the process of sending the encrypted package 1170, receiving the encrypted package 1170, and decrypting the encrypted message 1165 has also been described above.

In an embodiment, after the first application 1110 determines which recipient a message should be sent to, the first application prompts a user to open a second application 1120 based on the recipient's available method(s) of contact. In an embodiment, the first application 1110 causes a second application 1120 to be launched without additional user input, wherein the second application will be used to send an encrypted package to the intended recipient.

As an example of how the first application 1110 might be used, consider the following: a user may desire to send an encrypted message to a news outlet but does not know anyone at the news outlet, have access to anyone at the news outlet, want to be seen with anyone at the news outlet, have the news outlet know who they are, etc. If the news outlet has registered with the global private contact registry as already described with respect to system 1000, then the user may be able to find or search for the news outlet in their central address book 1130 in the first application 1110 on their user device. Then the user may enter clear data (e.g., text, files, images, video, sounds, other data, etc.) into the message content field 1190. Upon doing both above steps in this example, the user may then click the encrypt button 1160 which can then cause a clear data message to be encrypted in step 1180*a* into a proper encryption format, packaged in step 1180*b* into an encrypted package 1170 that is in a proper format for sending with the second application 1120. The second application 1120 can then be used to send the encrypted package 1170 to the selected recipient (from the recipient selection field 1140) with the correct contact information of that recipient so that the information can both be received by the intended recipient and can be decrypted by the intended recipient.

FIG. 12 is a user interface diagram useful for describing a second example central address book use-case scenario. The examples below describe how in conjunction with the systems and methods described above, a user may generate and distribute an encrypted package to a preset recipient in a central address book that is maintained by a global private contact registry.

Illustration 1200 shows how in an embodiment, clear data content to be encrypted may be automatically generated clear data content 1210 based on the selected recipient from the recipient selection field 1140. The generated clear data content 1210 can be predefined in registration information of the recipient. In an embodiment, after selecting a recipient in the recipient selection field 1140, clear data content is automatically generated 1210 and displayed in the message content field 1190, and the user is unable to change the automatically generated clear data content 1210 that is set to be encrypted for that recipient. In an embodiment, the automatically generated clear data content 1210 in the message content field 1190 is able to be added to, revised, and/or deleted before a clear data message is encrypted during step 1180*a* using the content in the message content field 1190. As an example, in an embodiment, after a user selects a recipient from the recipient selection field 1140, a template of content is automatically generated in the message content field 1190 with blanks that can be filled in.

In an embodiment, depending on the recipient that is currently selected in the recipient selection field 1140, user interface elements are generated that allow for a user to automatically generate clear data content in the message content field 1190. For example, upon selection of a suicide prevention hotline, a button may be displayed on the screen of the user device in the first application 1110 that allows for a clear data message to be automatically generated asking for help so that the message can more quickly be created, encrypted, packaged and sent.

In an example embodiment, after a user selects a charity from the recipient selection field 1140, a plurality of buttons are presented on the user interface of the user device. One or more buttons may ask the user what cause should be donated to, and one or more other buttons may ask the user what amount the donation should be. Then after the user selects a cause button (e.g., "environmental protection") and a donation button (e.g., "$50"), a clear data message is automatically generated and inserted into the message content field 1190 that states "I would like to donate $50 to an environmental protection cause within your charity" that the user can then easily and quickly encrypt, package, and send. In an embodiment, the encrypted message may contain a cryptocurrency wallet address so that the recipient can transfer an amount of cryptocurrency (e.g., 1 BTC, 1 ETH, 1 SOL, 1 ADA, 1 USDC, 1 MATIC, etc.) to the wallet address of the sender, so that the sender knows the wallet address of the recipient, so the sender can send a larger sum (e.g., donation) to the recipient's wallet address. In an embodiment, a wallet address of the sender and the key for the wallet address are encrypted and sent to the recipient. In an embodiment, the encrypted message may contain a cryptocurrency wallet address and an amount that is desired to be sent to and/or from the wallet address. In an embodiment, the encrypted message contains clear data that identifies a credit card number or a PAN, a temporary PAN, etc. to provide a financial institution of the sender with the sender's approval to transfer a certain amount of funds to the recipient (e.g., individual or entity).

In an embodiment, the clear data content of the message, the encryption of the clear data into an encrypted message 1165, the formatting of the encrypted package 1170, and the sending of the encrypted package 1170 to a second device are operations performed by the user device running the first application 1110. In an embodiment, all or some of these operations may be performed by a computing service that is communicatively coupled to the user device, such embodiments are further described in FIGS. 13 and 16.

Figure 13:
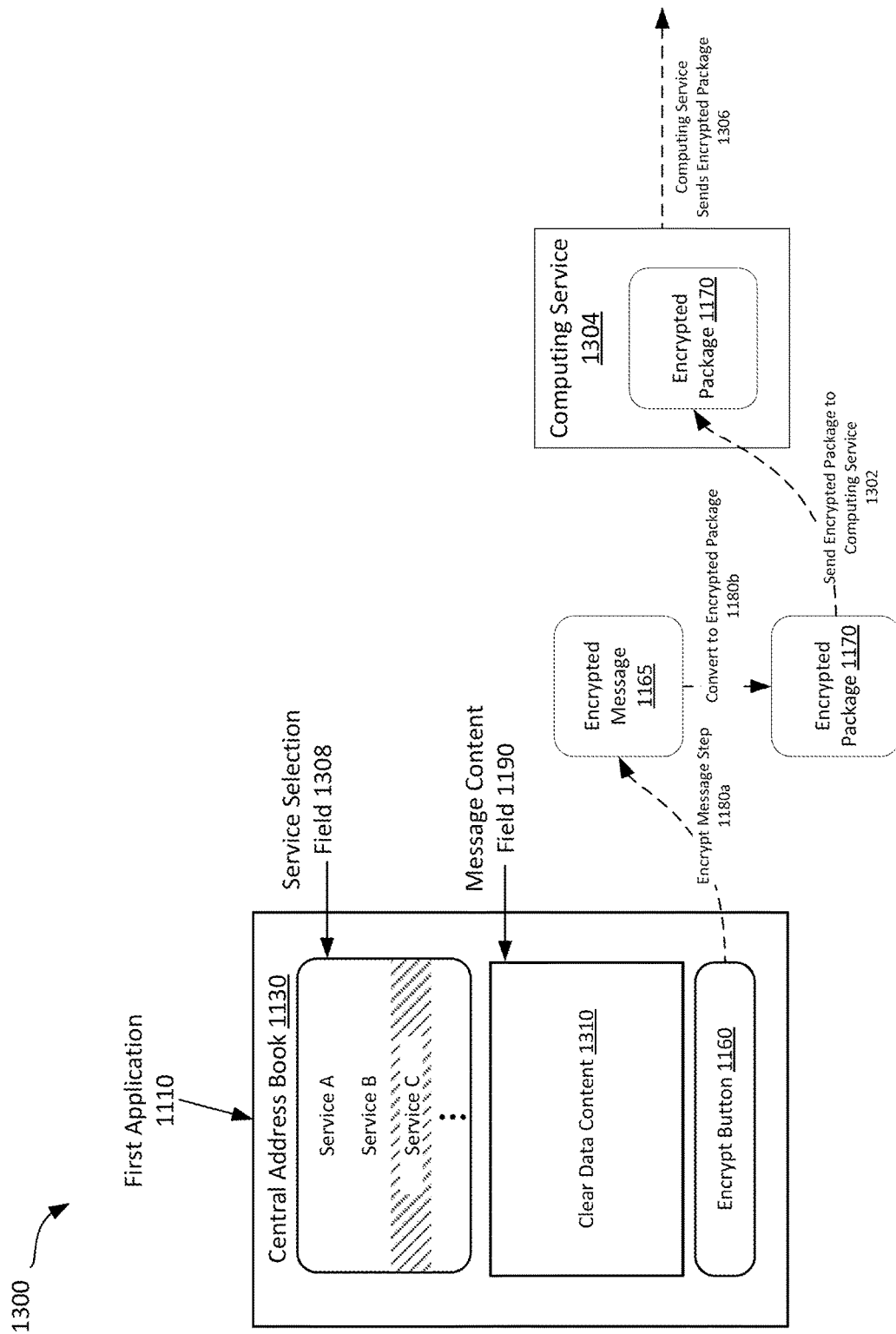
FIG. 13 is a user interface diagram useful for describing a third example central address book use-case scenario that uses a sending service.

FIG. 13 is a user interface diagram useful for describing a third example central address book use-case scenario that uses a computing service.

In an embodiment, the first application 1110 functions in ways similar to those already described but instead has a selection field that does not show a recipient and does not use a second application to send the encrypted package 1170.

System 1300 shows a service selection field 1308 as an alternative to a recipient selection field. The service selection field 1308 can function similarly to a recipient selection field; however, the service selection field 1308 may offer the ability to select a specific service to send a message to. For example, the service selection field 1308 only displays service offerings (e.g., suicide prevention hotline), then the sender selects a service type from the list so that once they send a message it is routed to a specific recipient which is determined to be the most relevant that offers the selected service (e.g., the message is routed to the nearest suicide prevention hotline service, such as the Chicago suicide prevention hotline). In an embodiment, the particular recipient associated with the chosen service is determined by the first application 1110, a computing service 1304, or a second application that is different than the first application.

In an embodiment, the clear data content 1310 may be entered by the user of the first application 1110, may be automated based on the recipient, service, etc. that a message will be going to, or may contain a combination of automatically generated clear data content 1310 and user entered clear data content 1310.

In an embodiment, the first application 1110 does not need the encrypt button 1160 to trigger the sending of clear data content 1310 to a recipient. For example, some embodiments allow for a recipient to be selected, and then may immediately generate and send a message based on the recipient that was selected. In some embodiments, the recipient may be selected, and then the user may be presented with one or more buttons they may press that cause a message to be generated and sent to the recipient.

In some embodiments, once the first application 1110 encrypts the clear data content 1310 into an encrypted message 1165 and converts the encrypted message into an encrypted package 1170 for sending, the user device does not use a second application. In some embodiments, the encrypted package 1170 is generated and a computing service 1304 is used to send the encrypted package 1170 to a recipient. In an embodiment, the computing service 1304 may be local to the user device, may be running on a different device or machine, or may be running within the first application 1110. The computing service 1304 may be able to further convert the encrypted package 1170 format. In an embodiment, the sending service packages the encrypted message into an encrypted package 1170 before sending it. In an embodiment, the sending service encrypts and packages the message before sending it. Examples of how computing service 1304 may be used and the actions it may perform regarding embodiments described herein are further described with respect to method 1600.

FIG. 14 is a flow diagram useful for describing how a global contact registry can be used by a user device.

At step 1402, the user device may receive based on a first user interface of a first application executing on a first device, user input that indicates a recipient, the recipient associated with registration information that indicates a method of communication with the recipient and an encryption key associated with the method of communication. The recipients may have gone through a registration process as described above so that they are listed in the global contact registry and so that their contact information is provided within the registry. The received user input may indicate the intended recipient directly such as by clicking on the recipient's name. In an embodiment, the user input may indicate the intended recipient indirectly by selecting a service, as an example, from a list of services, and then having the user device, the registry, or a computing service determine which recipient a message should be sent to based on the service selected by the user.

In an embodiment, the user device may display the recipient from a set of one or more registered recipients. The user device may display the recipient in the first application. Further, the user device may display the recipient based on a query entered by a user that is used to filter the set of recipients sent to the user device or filter the recipients that have been received by the user device. In an embodiment, the information associated with the recipient (e.g., service offering, location, methods of contact, etc.) is additionally or alternatively displayed as part of this step.

In an embodiment, the registration information indicates an entity employing the recipient, a service of the entity or the recipient, or a location of the entity or the recipient.

At step 1404, the user device may cause an encrypted message to be generated based on the encryption key, the encrypted message encrypting clear data received via the first user interface.

At step 1406, the user device may cause the encrypted message to be formatted into an encrypted package, that is in an application format compatible with a second application that corresponds to the method of communication, wherein the application format is compatible with the second application by at least being in a format that is allowed to be sent or to be processed by the second application. In an embodiment, the first application is used to encrypt the message and/or to format the message before it is provided to the second application. In an embodiment, a computing service may encrypt the message and/or format the package into an encrypted package with the encrypted message.

At step 1408, the user device may cause the encrypted package to be provided to the second application to be sent to the recipient. In an embodiment, the second application is executed on the first device. In an embodiment, the encrypted package is sent by the second application, which may or may not be the same as the first application. In an embodiment, the user device sends the encrypted package to a computing service that may or may not be running on the device which then sends the encrypted package to the intended recipient. In an embodiment, the message is encoded and packaged by the first application before then sending the package by using the second application.

In an embodiment, the first or second application may send the encrypted package to a computing service so that the computing service may send the encrypted package to the second device of the recipient.

The clear data message may be any form of data. For example, the clear data message could be an attached file, entered text, or any combination thereof. Further, in an embodiment, the user input consists of a user clicking a field or button that is presented on the UI to cause a clear data message to be generated for sending. As an example, a button may be presented on the screen that says "SOS" because the user chose an emergency service. Upon the user clicking the SOS button, a clear data message may automatically be generated in a message field on the device so that the user can then press an encrypt button so the clear data message can be encrypted, packaged, and sent by a second application or a computing service. In an example, upon the user clicking the SOS button, a clear data message may automatically be generated in a message field on the device, the device may automatically generate an encrypted message, format the encrypted message into an encrypted package, and send the encrypted package based on the user input without the need for further user input.

Figure 15:
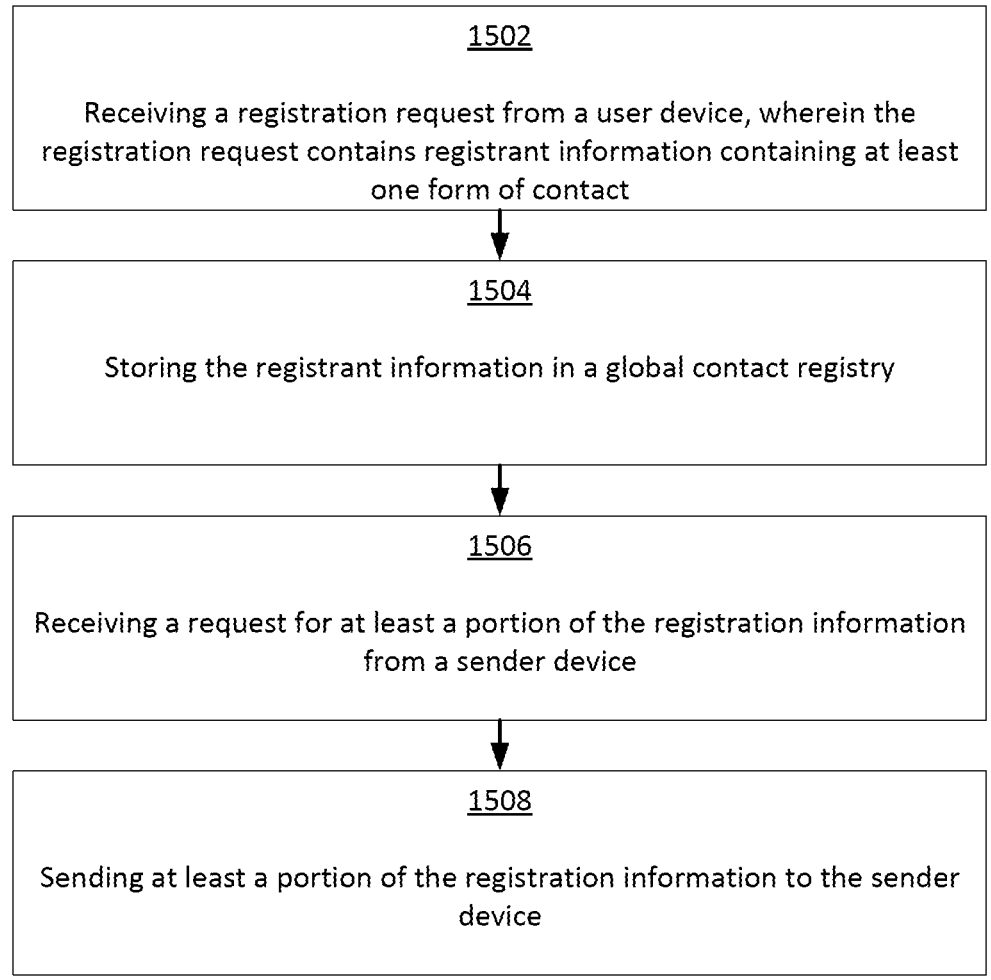
FIG. 15 is a flow diagram useful for describing how a global private contact registry can receive and send registrant information.

FIG. 15 is a flow diagram useful for describing how a global private contact registry (registry) can receive and send registrant information.

In step 1502, the registry receives a registration request from a user device. For a recipient to be registered with the registry, the recipient may need to provide at least one form of contact so that those who wish to contact them have a way to. A registrant may be able to provide the registry with additional information as already discussed above (e.g., location, services offered, alternate methods of contact, package formats that can be received, re-encryption key(s), etc.).

In step 1504, the registry stores the registration information that is received in the registry. The registry may be a single system or may consist of more than one system containing the registration data in an aggregated or duplicated manner.

In step 1506, the registry may receive a request for at least a portion of the registration information from a sender device (e.g., the sender device discussed in diagram 1400 or system 1000).

In step 1508, registration information is sent to the sender device so that it can be used to determine how a recipient associated with the registration information can be contacted, show a user other information associated with the registration information stored in the registry, and/or be used to send a message to the recipient associated with the registration information.

Figure 16:
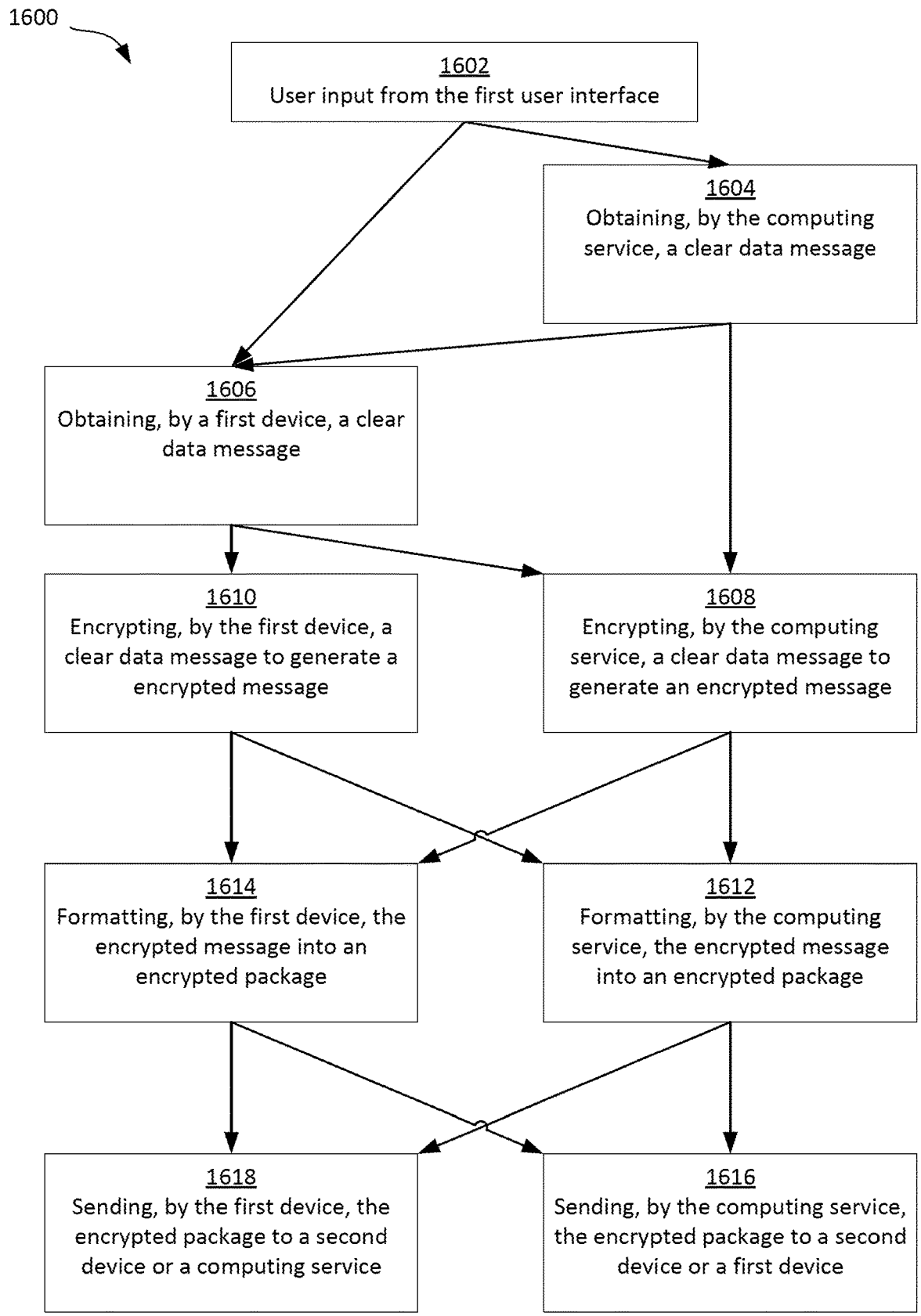
FIG. 16 is a flow diagram useful for describing how a computing service may be used to process data relating to user input received from a user device.

FIG. 16 is a flow diagram useful for describing how a computing service may be used to process data relating to user input received from a user device. A computing service may be useful to the device as it can provide computing power. Further, a computing service may also be useful to help create anonymity in the systems and methods described.

In step 1602, user input is received from a first user interface of a first user device. The user input may be a selection of a recipient, a button press to automatically send an autogenerated message, and/or may be a button press indicating that the user is ready for the message to be encrypted and sent, etc.

In step 1604, in response to user input at the first user interface at step 1602, the first user device may cause the computing service to obtain a clear data message. For example, there may be preset clear data messages that have been configured for one or more registered recipients, so that when the recipient is selected from a list of recipients, a message is automatically generated or populated. In some embodiments, the preset clear data messages have been preconfigured by the registered recipients. In an embodiment, the clear data message is obtained from a clear data field and/or attachment entered by the user of the first user device interface in step 1602.

In an embodiment, in step 1606, a clear data message is obtained by the first user device after user input is received at the first user interface in step 1602. For example, the first device may obtain a clear data message from a message content field on the first user interface after user input from step 1602 is received. In an embodiment, the first user device obtains a clear data message at step 1606 from the computing service that obtained the clear data message based on step 1604.

In step 1610, the first user device may encrypt a clear data message obtained by the first user device in step 1606 to produce an encrypted message. In an embodiment, the first user device may encrypt a message based on a clear data message that was obtained by the computing service in step 1604. For example, user input obtained by the first device may then be encrypted at the first device. In an example, user input obtained by a computing service in step 1604 may be obtained by the first device in step 1606 so that the first device may encrypt the clear data message in step 1610. In some embodiments, the encryption is done by the first device because the key used for the encryption of a clear data message is contained on the first user device. In some embodiments, a public key of the intended recipient is obtained from a computing service or the registry before or after the based on the selected recipient.

In some embodiments, at step 1608, the computing service generates an encrypted message from the clear data message. In some embodiments, the clear data message obtained by the user device in step 1606 is sent by the first user device to the computing service so that the clear data message can be encrypted in step 1608. In some embodiments, the key(s) for encryption are obtainable by the computing service and not the first user device, therefore the computing service may encrypt the clear data message. In an embodiment, the clear data message is encrypted by the computing service to reduce the required processing requirements of the first user device and/or keep the first device from having knowledge of the clear data contained within the encrypted message. Step 1608 shows that the clear data message may already be obtained by the computing service from step 1604, or may be obtained from the first user device after step 1606.

Further, in an embodiment, the encrypted message (encrypted by a device during step 1610 or encrypted by a computing service during step 1608) may be re-encrypted by a computing service in an embodiment before the re-encrypted message is formatted by a device in step 1614 or formatted by a computing service in step 1612. Thus, in some embodiments, a device or a computing service may encrypt a message, and use a proxy (e.g., a computing service, a second computing service, etc.) to re-encrypt the message, thereby allowing the sender to send an encrypted message to a recipient without the recipient knowing the public key of the sender. Since the public key of the sender does not need to be known by the recipient, re-encryption schemes can allow the recipient to have no knowledge of who the sender of a received re-encrypted message is. This can also allow the sender to utilize a computing service as delegate to determine the final recipient. For example, the sender may only know they are sending a message to a specific news agency, but the sender does not need to know which reporter is receiving the information. Thus, re-encryption may allow for a message to remain encrypted during transit of the message and could not be decrypted by the proxy (e.g., a computing service). In an embodiment, the proxy is not a computing service, but instead, the proxy is an entity (e.g., news agency). For example, a message may be sent to an organization (e.g., a company), while being able to be redirected to a specific recipient (e.g., an individual person) within the company without anyone else in the company being able to decrypt the message. In an embodiment where re-encryption is used, the re-encryption may be done on the encrypted message and/or the encrypted package. In an embodiment, the proxy is configured to use a bi-directional or unidirectional re-encryption scheme. In an embodiment, re-encryption may be used even when the sender's identity and/or public key is knows to a recipient.

In an embodiment, the encrypted message is transcoded into a multimedia file prior to the formatting of an encrypted package in steps 1612 or 1614, wherein the formatting is applied to a multimedia file. In an embodiment, the transcoding is applied to a clear data message before encryption of the message takes place (e.g., before steps 1610 or 1608). In an embodiment, the transcoding of a clear data message and/or encrypted message is done by a computing device or a first user device. Transcoding may be useful to hide a message in plain sight as transcoding may allow for a message to be hidden in a picture, video, or audio file that is perceptible or imperceptible to a human. In an embodiment, the multimedia file to be used with the transcoding process is able to be chosen by the user.

In an embodiment, transcoding may be performed in accordance with the disclosures in U.S. application Ser. No. 17/534,442, "System, Method And Application For Transcoding Data Into Media Files," filed on Nov. 23, 2021, the content of which is incorporated herein by reference in its entirety. For example, transcoding may be performed on a clear data message, an encrypted message, or an encrypted package in order to make the result appear to as something they are not in a decrypted form. In an embodiment, a user is able to select a recognizable multimedia file (e.g., an audio file, visual file, etc.) to use when transcoding an encrypted message, thereby being able to hide the contents and existence of the encrypted contents in plain site because the file generated from transcoding appear as if it were the originally selected recognizable multimedia file. In an embodiment, a user is able to select any multimedia file for use when transcoding (allowing the message or file to hide in plain view) a message or file. In an embodiment, a user is able to select from a set number of template files that serve as a recognizable multimedia file for use when transcoding. In an embodiment, after the user device performs transcoding, the user device may say send the transcoded content to the computing service for further processing (next steps) or perform subsequent processing itself (perform the next steps on the user device). In an embodiment, after the computing service performs transcoding, the computing service may send the transcoded content to the user device for further processing (next steps) or perform subsequent processing itself (perform the next steps on the computing device).

At step 1612, the computing service may format an encrypted message into an encrypted package. The encrypted message may be obtained from the computing service after step 1608 in some embodiments. In some embodiments, the encrypted message is obtained from the first user device after the first user device encrypts the message in step 1610. Formatting may be done by the computing service instead of the first user device for various reasons (e.g., reducing processing requirements of the first user device, reducing latency, etc.).

At step 1614, the encrypted message may be formatted into an encrypted package by the first user device. The encrypted message may be received from the first user device after step 1610. In an embodiment, the encrypted message is received from the computing device after step 1608. The first user device may be used to format the package instead of the computing service for various reasons (e.g., knowledge regarding what application will be used to send the encrypted package, reduce latency, etc.).

At step 1618, the first user device may be used to send the encrypted package created in step 1614 or 1612 to a second device. In an embodiment, the first user device sends the encrypted package to a computing service which then sends the encrypted package to the second device. In an embodiment, once the first user device sends an encrypted package to the computing device, the computing service decrypts the message, encrypts the message with a same or different key, and then sends the encrypted message in the encrypted package to the second device (such embodiments may be useful to monitor message content, or help keep senders and recipients anonymous). In an embodiment, the computing service provides instruction to the first user device that instructs the first user device as to what application (the second application) should be used for sending the encrypted package.

At step 1616, the computing service may be used to send the encrypted package created in step 1614 or 1612 to a second device. In an embodiment, the computing service sends the encrypted package to the second device. In an embodiment, the computing service first sends the encrypted package to the first user device so that the first user device can be used to send the encrypted package to the second device.

By way of example, the first user device may obtain a clear data message input entered by a user into a first user interface. The first user device may then send the clear message data to a computing service to encrypt, and format a package into an encrypted package, and send the encrypted package to a second device. In another example, the first device may obtain a clear data message input entered by a user into a first user interface. The first user device may then perform encryption, formatting, and/or sending of the encrypted package to the second device while the computing device performs the functions not performed by the first user device. In some cases, it may be useful for a user device to perform all of the functions such as when data is meant to be more private (e.g., contains personal identifiable information, contains other important information, etc.). In some cases, it may be beneficial for the computing service to perform one or more of the described functions. For example, the computing service may be able to keep a first user device from possessing as much information as may otherwise be required.

One or more computing services may be used to carry out the various functionalities of a computing service.

The methods and systems described herein may also be used in conjunction with the methods and systems described in U.S. Application No. 17,534,442 titled "System, Method And Application For Transcoding Data Into Media Files" for encoding clear data messages as encrypted packages. Such encoding of clear data messages allows for the encrypted package that is sent to a recipient to appear as something different than the clear data it contains. For example, messages that are sent may have clear data message content (e.g., audio, video, image, text, or other file formats), but may appear as a picture, video, GIF, audio, or other type of content, allowing the for clear data to be hidden in plain sight.

The aforementioned example systems have been described with respect to interaction among several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

Furthermore, while a particular feature of the claimed subject matter may have been disclosed with respect to one of several implementations, such feature may be combined with one or more other features of the other implementations as may be desired and advantageous for any given or particular application. In addition, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A computer-implemented method comprising:
   receiving, based on a first user interface of a first application executing on a first device, user input that indicates a recipient, the recipient associated with registration information that indicates a method of communication with the recipient and a first encryption key associated with the method of communication;
   causing an encrypted message to be generated based on the first encryption key, the encrypted message encrypting clear data based on user input received via the first user interface;
   causing the encrypted message to be formatted into an encrypted package, that is in an application format compatible with a second application that corresponds to the method of communication, wherein the application format is compatible with the second application by at least being a format that is allowed to be sent or to be processed by the second application; and providing the encrypted package to the second application.

2. The method of claim 1, wherein the registration information indicates an entity employing the recipient, a service of the entity or the recipient, or a location of the entity or the recipient, a second encryption key of the recipient, an allow-list of the recipient, a deny-list of the recipient that is based on IP address, regions, countries, and/or senders, currencies accepted by the recipient, forms of payment accepted by the recipient, or message formats desired by the recipient.

3. The method of claim 1, wherein the second application is executed on the first device, and wherein the encrypted message is generated and formatted by the first application.

4. The method of claim 3 further comprising:
sending, by the second application, the encrypted package to a computing service remote from the first device, wherein the computing service is configured to store the registration information based on a registration process and to provide contact information to the first device for presentation at the first user interface, and wherein the encrypted package is provided by the first application to the second application, and wherein the computing service is further configured to send the encrypted package to a second device of the recipient.

5. The method of claim 4 wherein the contact information indicates an entity employing the recipient, a service of the entity or the recipient, or a location of the entity or the recipient and excludes an identification of the second device, the method of communication, a network address of the second device, or personal identifiable information of the recipient.

6. The method of claim 1, further comprising:
receiving, from a computing service based on the registration information, instructions to use the second application in association with sending the encrypted package.

7. The method of claim 1, wherein the clear data is generated as an automatic message based on a selection of the recipient via the first user interface, wherein the automatic message is populated based on the registration information.

8. The method of claim 1 further comprising:
sending, by the first application, the encrypted package to a computing service remote from the first device, wherein the computing service is configured to store the registration information based on a registration process, provide contact information to the first device for presentation at the first user interface, and execute the second application, and send the encrypted package to a second device of the recipient by using the second application.

9. The method of claim 1 further comprising:
sending, by the first application, the encrypted message to a computing service remote from the first device, wherein the computing service is configured to format the encrypted message into the encrypted package and to send the encrypted package to a second device of the recipient.

10. The method of claim 1, wherein the first application encrypts the clear data using a second encryption key of a computing service remote from the first device, wherein the computing service is configured to re-encrypt the encrypted message using the first encryption key associated with the method of communication and to send the re-encrypted message to a second device of the recipient.

11. The method of claim 1, wherein the second application is determined based on the registration information.

12. The method of claim 1, wherein the clear data is predefined by the recipient before the recipient is selected via the first user interface.

13. The method of claim 1, further comprising:
transcoding the encrypted message into a multimedia file prior to the formatting, wherein the formatting is applied to the multimedia file.

14. The method of claim 13, wherein the multimedia file is user-recognizable as an audio and/or visual file that presents information and hides encrypted data corresponding to the encrypted message.

15. The method of claim 13, wherein the multimedia file is generated based on a selection of a template file via the first user interface.

16. A user device comprising:
one or more processors; and
one or more memories storing computer-readable instructions that, upon execution by the one or more processors, configure the user device to:
receive, from a first user interface of a first application, user input that indicates a recipient, the recipient associated with registration information that indicates a method of communication with the recipient and an encryption key associated with the method of communication;
cause an encrypted message to be generated based on the encryption key, the encrypted message containing clear data based on user input received via the first user interface;
cause the encrypted message to be formatted into an encrypted package that is in an application format compatible with a second application that corresponds to the method of communication, wherein the application format is compatible with the second application by at least being a format that is allowed to be sent or to be processed by the second application; and
provide the encrypted package to the second application to be sent to the recipient.

17. The user device of claim 16, wherein the second application is executed on the user device, and wherein the encrypted message is generated and formatted by the first application.

18. The user device of claim 17, further configured to:
send, by the second application, the encrypted package to a computing service remote from the user device, wherein the computing service is configured to store the registration information based on a registration process and to provide contact information to the user device for presentation at the first user interface, and wherein the encrypted package is provided by the first application to the second application, and wherein the computing service is further configured to send the encrypted package to a second device of the recipient.

19. The user device of claim 16, further configured to:
send, by the first application, the encrypted message to a computing service remote from the user device, wherein the computing service is configured to format the encrypted message into the encrypted package and to send the encrypted package to a second device of the recipient.

20. The user device of claim 16, wherein the clear data is generated as an automatic message based on a selection of the recipient via the first user interface, wherein the automatic message is populated based on the registration information.

\* \* \* \* \*